(12) United States Patent
Takagaki

(10) Patent No.: US 8,593,781 B2
(45) Date of Patent: Nov. 26, 2013

(54) METALIZED FILM CAPACITOR

(75) Inventor: Koji Takagaki, Kyoto (JP)

(73) Assignee: Nichicon Corporation, Kyoto (JP)

( * ) Notice: Subject to any disclaimer, the term of this patent is extended or adjusted under 35 U.S.C. 154(b) by 187 days.

(21) Appl. No.: 13/138,313

(22) PCT Filed: Feb. 4, 2010

(86) PCT No.: PCT/JP2010/051572
§ 371 (c)(1),
(2), (4) Date: Aug. 1, 2011

(87) PCT Pub. No.: WO2010/090245
PCT Pub. Date: Aug. 12, 2010

(65) Prior Publication Data
US 2012/0002346 A1    Jan. 5, 2012

(30) Foreign Application Priority Data

Feb. 5, 2009 (JP) ................................. 2009-024624
Mar. 31, 2009 (JP) ................................. 2009-085036
May 19, 2009 (JP) ................................. 2009-121076
Aug. 28, 2009 (JP) ................................. 2009-197675

(51) Int. Cl.
*H01G 4/015* (2006.01)
*H01G 4/32* (2006.01)

(52) U.S. Cl.
USPC ........................................ 361/273; 361/301.5

(58) Field of Classification Search
CPC .................................................... H01G 4/015
USPC ........................................ 361/273, 301.5, 323
See application file for complete search history.

(56) References Cited

U.S. PATENT DOCUMENTS

| 5,136,462 A | 8/1992 | Steiner |
| 5,905,628 A | 5/1999 | Okuno et al. |
| 7,929,271 B2 * | 4/2011 | Kato et al. .................... 361/273 |
| 7,933,111 B2 * | 4/2011 | Yang et al. .................... 361/273 |
| 2008/0278888 A1 * | 11/2008 | Yang et al. .................... 361/323 |

FOREIGN PATENT DOCUMENTS

| JP | 4-225508 | 8/1992 |
| JP | 8-250367 | 9/1996 |

(Continued)

*Primary Examiner* — Eric Thomas
(74) *Attorney, Agent, or Firm* — Jordan and Hamburg LLP

(57) ABSTRACT

Disclosed is a metalized film capacitor having excellent safety preservation ability and an excellent withstand voltage at high temperatures. This capacitor has a structure for which a split electrode section wherein a split electrode is formed by spliting a metalized film along the longitudinal direction by means of plural insulating slits, and a non-split electrode section for which a vapor-deposited electrode is continuous in the longitudinal direction, are arranged alternately in the film width direction of the metalized film, with each split electrode being connected to the non-split electrode section by a fuse formed between the ends of adjacent insulating slits; and has a structure for which three rows or more of split electrode sections, which are split by means of insulating slits that are aligned in the longitudinal direction of the film, are arranged in the width direction, with each split electrode that forms a split electrode section being connected to an adjacent split electrode by a fuse, and the area of a split electrode in the center of the film being smaller than the area of a split electrode arranged on the outer side.

17 Claims, 18 Drawing Sheets

(56) References Cited

FOREIGN PATENT DOCUMENTS

| | | |
|---|---|---|
| JP | 9-232178 | 9/1997 |
| JP | 10-070038 | 3/1998 |
| JP | 10-144563 | 5/1998 |
| JP | 11-026280 | 1/1999 |
| JP | 11-026281 | 1/1999 |
| JP | 11-045820 | 2/1999 |
| JP | 2003-338422 | 11/2003 |
| JP | 2004-087648 | 3/2004 |
| JP | 2005-012082 | 1/2005 |
| JP | 2008235414 A * | 10/2008 |
| JP | 2008235415 A * | 10/2008 |

* cited by examiner

Fig. 2-A
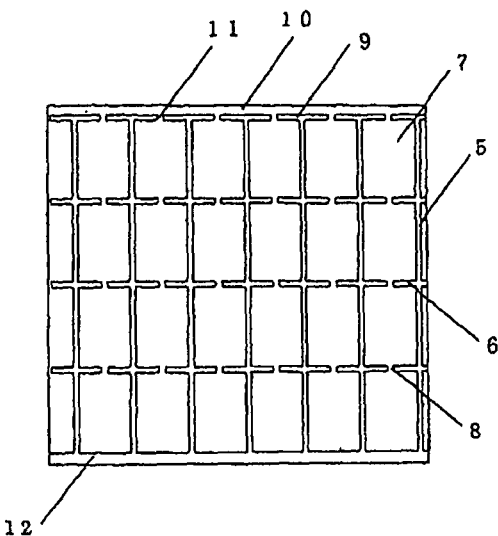
Fig. 2-B
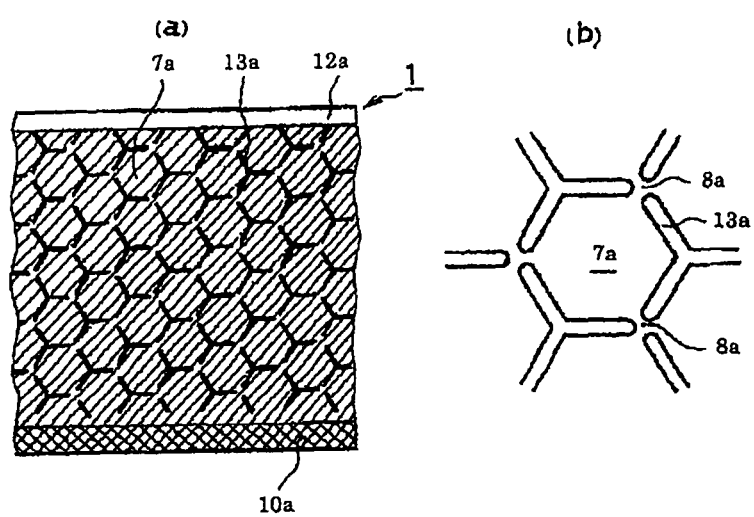
Fig. 2-C
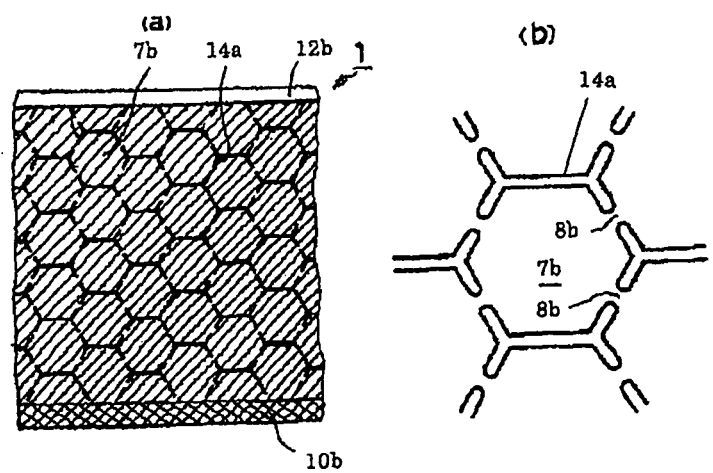

- second large split electrode section
- second small split electrode section
- first large split electrode section
- first small split electrode section
- insulating margin

METALIZED FILM CAPACITOR

CROSS REFERENCE TO RELATED APPLICATION

The disclosure of Japanese Patent Applications No. 2009-024624 filed Feb. 5, 2009, No. 2009-085036 filed Mar. 31, 2009, No. 2009-121076 filed May 19, 2009, and No. 2009-197675 filed Aug. 28, 2009 including specification, drawings and claims is incorporated herein by reference in its entirety.

TECHNICAL FIELD

The present invention relates to a metalized film capacitor used for the smoothing or the filter of an inverter circuit for industrial devices, automobiles, and others.

BACKGROUND ART

In a metalized film capacitor in the prior art, a metalized film is used in which a metallikon-vicinity vapor-deposited electrode 2 on a polypropylene film 1 illustrated in FIG. 1 is thickly formed and a non-metallikon-vicinity vapor-deposited electrode 3 thereon is thinly formed by vapor deposition, and an insulating margin 4 is formed at an end region of the film opposed to the metallikon. When the polypropylene film undergoes dielectric breakdown in this metalized film capacitor, the vapor-deposited electrode around the dielectric broken site is scattered by discharge energy therefrom, whereby the capacitor has a self-restoring function of restoring electric insulation of the dielectric broken site. However, at a high temperature and a high pressure, the number of dielectric broken sites increases so that the self-restoring function is not sufficiently obtained. Thus, the capacitor may turn into a short circuit mode. As illustrated in, for example, FIG. 11, in a metalized film capacitor obtained by stacking or winding metalized films each having an vapor-deposited metal film on a dielectric body (plastic film), the dielectric may be broken at a site marked "x" in the drawing. When the capacitor has insufficient self-healing performance (scattering performance of the vapor-deposited metal), the broken film becomes electrically conductive to the vapor-deposited metal on the other metalized film, which is arranged beneath this metalized film, through the broken dielectric portion.

A smoothing capacitor of an inverter circuit is used at a high temperature and a high voltage, and is further intensely required to have safety. Thus, a metalized film in which an vapor-deposited electrode is divided into plural segments is adopted (see, for example, Patent Documents 1 to 3). Examples of a metalized film in which such split electrodes are formed are illustrated in [FIG. 2-A] to [FIG. 2-C].

In [FIG. 2-A], an insulating margin 12 is formed at an end region of a metalized film that is opposed, in the width direction thereof, to a metallikon-connection section 10 of the film. By width direction insulating slits 5 and longitudinal direction insulating slits 6, split electrodes 7 are formed. These split electrodes 7 are connected to each other through fuses 8 in each row of the electrodes 7. Furthermore, at the vapor-deposited electrode in the vicinity of the metallikon, the metallikon-connection section 10 is separated from some of the split electrodes 7 by longitudinal direction insulating slits 9. The metallikon-connection section 10 is connected to each of the split electrodes 7 through a fuse 11.

In [FIG. 2-B], an insulating margin 12a is formed at an end region of a metalized film that is opposed, in the width direction thereof, to a metallikon-connection section 10a of the film. Honeycombed split electrodes 7a are formed by Y-shaped insulating slits 13a. These split electrodes 7a are connected to each other into the form of arranged rows through fuses 8a.

In [FIG. 2-C], an insulating margin 12b is formed at an end region of a metalized film that is opposed, in the width direction thereof, to a metallikon-connection section 10b of the film. Honeycombed split electrodes 7b are formed by Muller-Lyer-shaped insulating slits 14a. These split electrodes 7b are connected to each other into the form of arranged rows through fuses 8b.

When dielectric breakdown is generated in the dielectric body of a metalized film capacitor using such a metalized film having split electrodes, the capacitor has the above-mentioned self-restoring function. Simultaneously, the capacitor has the following functions to keep high safety certainly: even when dielectric breakdown is generated beyond the self-restoring function of the metalized film capacitor, an electric current flows into the split electrodes in which the dielectric breakdown is generated from the split electrodes around the electrodes; thus, the vapor-deposited electrode of the concerned fuse regions is scattered, whereby the dielectric-breakdown-generated split electrodes are separated from the other split electrodes so that electric insulation is restored.

Furthermore, when the area of the split electrodes is made small, a decrease in the capacity based on the action of the fuses can be restrained so that the lifespan of the capacitor can be made long. However, when the split electrodes are made too fine, the energy of the split electrodes becomes small. Thus, when the split electrodes undergo dielectric breakdown, the fuses come not to act easily so that the safety of the capacitor declines. This phenomenon becomes more remarkable as the temperature becomes high.

When the split electrode area is made small, the number of fuses increases. However, the fuses have a higher resistance than the split electrodes. It is therefore reported that heat generated from the capacitor increases (see, for example, Patent Document 4). Such an increase in self-heating causes a fall in the voltage endurance performance or safety-keeping performance. The temperature of the capacitor element is most highly raised, in particular, at the center by self-heating, so that the center becomes poorer in voltage endurance performance or safety-keeping performance than the other regions.

Thus, in order to overcome the above-mentioned inconvenience, the following means has been invented: a means in which split electrodes, as well as a non-split electrode large in area (non-split electrode section), are collectively arranged (see, for example, Patent Document 5). In a metalized film capacitor described in Patent Document 5, split electrodes divided from each other by slits are arranged at the insulating margin side, and a non-split electrode section is arranged at the terminal-connection section side (metallikon-connection section side) thereof. The split electrodes are formed to have a structure in which the area of the vapor-deposited electrodes becomes small at positions nearer to the insulating margin.

PRIOR ART DOCUMENTS

Patent Documents

Patent Document 1: JP-A-08-250367
Patent Document 2: JP-A-11-26281
Patent Document 3: JP-A-11-26280
Patent Document 4: JP-A-2003-338422
Patent Document 5: JP-A-2005-12082

SUMMARY OF THE INVENTION

Problems to be Solved by the Invention

Incidentally, capacitors used for the smoothing of inverter circuits for automobiles, or other purposes are used at a high temperature, a high frequency and a high voltage, and are required to be made small in size and have high safety. For this purpose, it is indispensable that their dielectric films are made thin to make the capacitor small in size and further not only an improvement in voltage endurance performance but also safety are realized at high temperatures.

However, in the metalized film capacitor described in Patent Document 5, split electrode sections in which split electrodes relatively small in electrode area (small split electrode sections) are arranged in the longitudinal direction are collectively arranged at the insulating margin side while a split electrode section in which split electrodes relatively large in electrode area (large split electrode section) and a non-split electrode section are arranged in the longitudinal direction at the terminal-connection section side; therefore, under the present situation, the capacitor does not necessarily keep sufficient safety-keeping performance at high temperatures. Specifically, when dielectric breakdown is generated in some of the small split electrode sections, from the split electrodes adjacent to the split electrodes constituting the small split electrode sections in which the dielectric breakdown is generated, an electric current sufficient for causing the concerned fuses to act does not flow into the fuses. Thus, it is feared that the fuses cannot be caused to act, in particular, at high temperatures.

In order to form the split electrodes (divide the electrode by insulating slits), it is necessary to paint a masking oil onto the metalized film. However, by the effect of the remaining masking oil, which adheres thereto at the time of the evaporation, a difference is generated in the slipping property of the metalized film between the small split electrode sections, the large split electrode sections, and the non-split electrode section.

However, in the metalized film capacitor described in Patent Document 5, from the insulating margin side to the terminal-connection section side, the non-split electrode section, the large split electrode sections and the small split electrode sections are arranged in this order in the width direction; thus, the positions of the insulating slits on the metalized film are very unevenly distributed in the width direction. As a result, the slipping property of the metalized film is remarkably varied in the width direction. Thus, when the metalized film is wound up, the film-wound element turns into an uneven state so that its voltage endurance performance at high temperatures is affected.

Furthermore, in the metalized film capacitor described in Patent Document 5, an electric current flowing in effective electrode sections that create the capacity of the metalized film is made smaller at its region nearer to the insulating margin. In this way, heat generated therefrom is decreased. However, under the present situation, the capacitor does not necessarily keep sufficient voltage endurance performance at high temperatures. In other words, it is known that the temperature of a capacitor element is most highly raised at the center by self-heating, so that the center becomes poorer in voltage endurance performance or safety-keeping performance than the other regions; in the metalized film capacitor described in Patent Document 5, the self-heating of the center of the capacitor element cannot be sufficiently restrained so that the capacitor may lower in voltage endurance performance.

In light of the above-mentioned problems, this invention has been made. An object thereof is to provide a metalized film capacitor having good safety-keeping performance and endurance voltage performance at high temperatures.

Means for Solving the Problems

The invention is one for solving the problems, and a first aspect of the invention is a metalized film capacitor, including a capacitor element formed by winding up or stacking one or more metalized films in which an vapor-deposited electrode is laid on at least one surface of a dielectric film, and an electrode-leading-out metallikon connected to each of both end faces of the capacitor element, wherein the metalized film comprises one or more split electrode sections in which the vapor-deposited electrode is divided by plural insulating slits arranged in the longitudinal direction of the metalized film to form split electrode, and one or more non-split electrode sections in which the vapor-deposited electrode is continuous in the longitudinal direction are arranged in the width direction of the metalized film so as to alternate the split electrode section with the non-split electrode section; and each of the split electrodes, which correspond to segments of the split electrode section, is connected to the non-split electrode section through a fuse formed between an end region of one of any adjacent two of the insulating slits and an end region of the other.

According to the invention having such a structure, an vapor-deposited electrode is divided into split electrodes by insulating slits, and each of the split electrodes is connected to a non-split electrode section in which the vapor-deposited electrode is continuous in the longitudinal direction through a fuse. Such one or more split electrodes and such one or more non-split electrodes are arranged in the width direction of the metalized film to alternate the split electrode section with the non-split electrode. Therefore, even when the area of the split electrodes is made small (the split electrode section is finely divided), the capacitor can obtain stable safety-keeping performance, and can restrain a reduction in capacity by fuse action. In other words, the division of the split electrode section into fine segments favorably makes it possible to restrain a reduction in the capacity based on fuse action. On the other hand, the division makes the fuse action difficult so that the capacitor is unfavorably declined in safety-keeping performance. Against this, according to this invention, even when dielectric breakdown is caused in the split electrode section, a sufficient electric current flows into the concerned fuse since the split electrode section and the non-split electrode section are arranged to alternate the former section with the latter section in the width direction. At least one end of the split electrode section is adjacent to the non-split electrode section. Thus, a sufficient electric current flows into the concerned fuse, so that the fuse can be certainly caused to act (to cause the vapor-deposited electrode at the fuse region to scatter) so that the split electrode section in which the dielectric breakdown is caused can be separated. In this way, the capacitor can obtain stable safety-keeping performance even when its split electrodes are made small.

Since the split electrode section and the non-split electrode are arranged to alternate the section with the electrode in the width direction of the metalized film, the positions of the insulating slits on the metalized film are prevented from being unevenly distributed in the width direction. Thus, the slipping property of the metalized film can be made even in the width direction. As a result, when the metalized film is wound up, the film-wound element is restrained from coming into an uneven state. Thus, the capacitor can keep good voltage endurance performance at high temperatures. Accordingly, a metalized film capacitor can be provided which has good safety-keeping performance and voltage endurance performance at high temperatures (for example, temperatures higher than 100° C.).

In the metalized film capacitor including the capacitor element made of a metalized film pair in which two of the metalized films are stacked onto each other, it is preferred that the whole of the non-split electrode section formed in one of the paired metalized films is opposed to the split electrode section formed on the other metalized film. According to this structure, even when one of the paired metalized films undergoes dielectric breakdown, which is caused beyond the self-restoring function (self-healing function) of the metalized film, in its non-split electrode, a sufficient electric current flows from the non-split electrode adjacent to the opposed split electrode formed on the other of the paired opposed metalized films to this split electrode. For this reason, the fuse formed between this split electrode and the non-split electrode can be caused to act certainly (to cause the vapor-deposited electrode at the fuse region to scatter). Thus, this split electrode can be separated from the other split electrodes. As a result of this effect, even when dielectric breakdown is caused in the non-split electrode of one of the paired metalized films, electric insulation of the non-split electrode is restored so that the metalized films can maintain the function of a capacitor.

It is also preferred that the non-split electrode section is arranged for electrode-leading-out at a metallikon-connection section side of the metalized film for the following reason: if the split electrode section is arranged at the metallikon-connection section side, when dielectric breakdown is generated in this split electrode section, the fuse for connecting this split electrode section to the concerned non-split electrode section may act. According to the action, an electric current path from the split electrode section is completely blocked. Thus, the element may come not to function as a capacitor. Against this, the above-mentioned non-split electrode section is arranged at the metallikon-connection section side, whereby even when dielectric breakdown is generated in the non-split electrode at the electrode-leading-out side (the non-split electrode formed in one of the paired metalized films), the concerned fuse acts, the fuse being the fuse for connecting the opposed split electrode formed in the metalized film (the other of the paired metalized films) to the non-split electrode adjacent to this split electrodes. This matter makes it possible that the present element keeps holding an electrode region functioning as a capacitor (so as to keep an electric current path from the non-split electrode).

The above-mentioned metalized film capacitor may be made into the following specific embodiments: for example, in the metalized film capacitor in which the metalized film has, in an end region thereof at an opposite side in the width direction of the metallikon-connection section, an insulating margin where no vapor-deposited electrode is formed, this capacitor may include a first split electrode section in which plural Y-shaped insulating slits are arranged in the longitudinal direction at the insulating margin side of the film, whereby split electrodes are formed between the Y-shaped insulating slits, and a second split electrode section in which Muller-Lyer-shaped insulating slits are arranged in parallel to the arrangement direction of the Y-shaped insulating slits, whereby split electrodes are formed between the Muller-Lyer-shaped insulating slits; and the non-split electrode section may be formed between the first split electrode section and the second split electrode section. In this structure, a plurality of the second split electrode sections may be formed in the width direction, and another of the non-split electrode sections may be formed between any adjacent two of the second split electrodes. Furthermore, plural Y-shaped insulating slits may be arranged along the longitudinal direction at the metallikon-connection section side, whereby the capacitor further includes a third split electrode section in which split electrodes are formed between the Y-shaped insulating slits, and any one of the non-split electrode sections is formed between any one of the second split electrode sections and the third split electrode section.

Moreover, the metalized film capacitor may include an insulating margin side split electrode section in which plural Y-shaped insulating slits are arranged along the longitudinal direction at the insulating margin side, whereby split electrodes are formed between the Y-shaped insulating slits, and a metallikon-connection section side split electrode section in which plural Y-shaped insulating slits are arranged along the longitudinal direction at the metallikon-connection section side; and the non-split electrode section may be formed between the insulating margin side split electrode section and the metallikon-connection section side split electrode section.

A second aspect of the invention for solving the problems is a metalized film capacitor, including a capacitor element formed by winding up or stacking one or more metalized films in which an vapor-deposited electrode is laid on at least one surface of a dielectric film, and an electrode-leading-out metallikon connected to each of both end faces of the capacitor element, wherein the metalized film comprises split electrode sections in which the vapor-deposited electrode is divided into plural split electrodes by insulating slits arranged in the longitudinal direction of the metalized film and at intervals are arranged in three or more rows in the width direction of the film; each of the split electrodes, which constitute the individual split electrode sections, is connected to any one of the split electrodes that is adjacent to the split electrode in the width direction through a fuse formed between any two of the insulating slits, between the two the split electrode being sandwiched in the longitudinal direction; and the area of each of the split electrodes that form one or more central split electrode sections arranged in a central region in the width direction, out of all the split electrode sections, is smaller than that of each of the split electrodes that form outside split electrode sections arranged at the outsides in the width direction of the central split electrode section, respectively.

In the second aspect of the invention having this structure, the area of each of the split electrodes that form the central split electrode section arranged in the central region in the width direction is smaller than that of each of the split electrodes that form the outside split electrode sections arranged at the outsides in the width direction of the central split electrode section, respectively; therefore, about this capacitor element, which is formed by winding or stacking the metalized film, the number of the split electrodes at the element central region increases. As a result, the number of electric current paths increases at the central region of the capacitor element so that the electric resistance at the element central region falls. Therefore, the temperature of the central region of the capacitor element can be restrained from being raised by self-heating of the region. Thus, the voltage endurance performance of the metalized film capacitor can be improved and the lifespan thereof can be made long.

When the interval between the insulating slits arranged in the central split electrode section is made smaller than that between the insulating slits arranged in the outside split electrode sections, the area of each of the split electrodes that form the central split electrode section can be made smaller than that of each of the split electrodes that form the outside split electrode sections while the film is restrained from becoming long in the width direction.

In the capacitor element made of a metalized film pair in which two of the metalized films are stacked onto each other, it is preferred that the respective central split electrode sections formed on the paired metalized films are overlapped with each other. According to this structure, even when the two metalized films are stacked onto each other, the respective central split electrode sections formed on the paired metalized films overlap with each other, thereby making it possible to restrain effectively the temperature of the central region of the capacitor element from being raised by self-heating of the region.

Furthermore, any adjacent two of the split electrodes, between the two one of the insulating slits arranged in the central split electrode section being sandwiched in the longitudinal direction, may be connected to each other through a fuse; and the width of the fuses through each of which one of the split electrodes that form the central split electrode section is connected to one of the split electrodes that form the outside split electrode sections may be made larger than that of the fuses through each of which any two of the split electrodes that form the central split electrode section are connected to each other. According to this structure, the number of electric current paths in the central region of the capacitor element can be further increased, so that the self-heating can be further restrained. Moreover, when the width of the fuses through each of which one of the split electrodes that form the central split electrode section is connected to one of the split electrodes that form the outside split electrode sections is made larger than that of the fuses through each of which any two of the split electrodes that form the central split electrode section are connected to each other, the capacitor can keep sufficient fuse-acting performance certainly even in the central split electrodes, which are small in split electrode area to be small in energy for causing the fuses to act.

A third aspect of the invention is a metalized film capacitor including a capacitor element formed by winding up or stacking one or more metalized films in which an vapor-deposited electrode is laid on at least one surface of a dielectric film, and an electrode-leading-out metallikon connected to each of both end faces of the capacitor element, wherein the metalized film comprises one or more small split electrode sections in which plural first split electrodes formed by dividing the vapor-deposited electrode by insulating slits arranged in the longitudinal direction of the metalized film and at intervals are formed along the longitudinal direction, and one or more large split electrode sections in which second split electrodes formed by dividing the vapor-deposited electrode by insulating slits arranged in the longitudinal direction of the metalized film and at intervals are formed along the longitudinal direction, the electrode area of the second split electrodes being larger than that of the first split electrodes; the small split electrode section being arranged adjacently to the large split electrode section in the width direction of the metalized film; and each of the first split electrodes being connected to any one of the second split electrodes through a fuse formed between two of the insulating slits, between the two the first split electrode being sandwiched in the longitudinal direction.

According to the third aspect of the invention having this structure, each of the first split electrodes relatively small in electrode area is connected to any one of the second split electrodes relatively larger in electrode area through the fuse. The small split electrode section, which is composed of these first split electrodes, is arranged adjacently to the large split electrode section, which is composed of the second split electrodes, in the width direction of the metalized film. For this reason, at least one of the end regions of each of the first split electrodes is connected through one of the fuses to one of the second split electrodes larger in electrode area than the first split electrodes. Therefore, even when dielectric breakdown is generated in some of the first split electrodes, an electric current sufficient to cause the concerned fuses to act flows thereinto from the second split electrodes adjacent to the first split electrodes, so as to permit the fuses to act certainly (to cause the vapor-deposited electrode in the fuse regions to scatter). As a result, the split electrodes where the dielectric breakdown is caused can be separated. This matter makes it possible that the capacitor gains stable safety-keeping performance even when the split electrodes are made small.

Furthermore, the small split electrode section and the large split electrode section are arranged to alternate the former section with the latter section in the width direction of each of the metalized films; thus, the positions of the insulating slits in the metalized film are prevented from being unevenly located in the width direction, so that the slipping property of the metalized film can be made even in the width direction. As a result, when the metalized film is wound, the film-wound element is restrained from coming into an uneven state, so that the element can certainly keep good voltage endurance performance at high temperatures. Accordingly, a metalized film capacitor can be provided which has good safety-keeping performance and voltage endurance performance at high temperatures (for example, temperatures higher than 100° C.).

When the interval between the insulating slits arranged in the small split electrode section is made smaller than that of the insulating slits arranged in the large split electrode section, the area of the first split electrodes can be made smaller than that of the second split electrodes while preventing the film from becoming long in the width direction.

In the metalized film capacitor including the capacitor element made of a metalized film pair in which two of the metalized films are stacked onto each other, it is preferred that the whole of the large split electrode section formed in one of the paired metalized films is opposed to the small split electrode section formed in the other metalized film. According to this structure, even when one of the paired metalized films undergoes dielectric breakdown, which is caused beyond the self-restoring function (the self-healing function) of the metalized film, in some of its second split electrodes, a sufficient electric current flows from the second split electrodes adjacent to the opposed first split electrodes formed on the other of the opposed paired metalized films, the second split electrodes being larger in electrode area than the first split electrodes, to the first split electrodes. For this reason, the concerned fuses formed between the first split electrodes and second split electrodes formed on the other film of the paired metalized films act certainly (to cause the vapor-deposited electrode at the fuse regions to scatter), so that the second split electrodes can be separated from the other split electrodes. As a result of this effect, even when dielectric breakdown is caused in some of the second split electrodes formed in one of the paired metalized films, electric insulation of these second split electrodes is restored so that the present element can maintain the function of a capacitor.

It is preferred that the large split electrode section is arranged for electrode-leading-out at the metallikon-connection section side of the metalized film for the following reason: if the small split electrode section is arranged at the metallikon-connection section side, the following may be caused when dielectric breakdown is generated in some of the first split electrodes constituting this small split electrode section: the fuses for connecting these first split electrodes to the concerned second split electrodes act, so that an electric current path from the first split electrodes is completely blocked. Thus, the element may come not to function as a capacitor. Against this, the large split electrode section is arranged at the metallikon-connection section side, whereby the following is attained: even when dielectric breakdown is generated in some of the second split electrodes at the electrode-leading-out side (the second split electrodes constituting the large split electrode section formed in one of the paired metalized films), the fuses act, these fuses being fuses for connecting the opposed first split electrodes formed in the metalized film (the other of the paired metalized films) to the second split electrodes adjacent to these first split electrodes. This matter makes it possible that the present element keeps holding an electrode region functioning as a capacitor.

A fourth aspect of the invention for solving the above-mentioned problems is a metalized film capacitor, including a capacitor element formed by winding up or stacking one or more metalized films in which an vapor-deposited electrode is laid on at least one surface of a dielectric film, and an electrode-leading-out metallikon connected to each of both end faces of the capacitor element, wherein the metalized film comprises a small split electrode section in which plural small split electrodes formed by dividing the vapor-deposited electrode by insulating slits arranged in the longitudinal direction of the metalized film and at intervals are formed along the longitudinal direction, a large split electrode section in which plural large split electrodes formed by dividing the vapor-deposited electrode by insulating slits arranged in the longitudinal direction of the metalized film and at intervals are formed along the longitudinal direction, the electrode area of the large split electrodes being larger than that of the small split electrodes, and a non-split electrode section in which the vapor-deposited electrode is continuous in the longitudinal direction; the small split electrode section being arranged adjacently to either the large split electrode section or the non-split electrode section in the width direction of the metalized film; and each of the small split electrodes being connected to any one of the large split electrodes or the non-split electrodes through a fuse formed between two of the insulating slits, between the two the small split electrode being sandwiched in the longitudinal direction.

According to the fourth aspect of the invention having this structure, the small split electrode section composed of the small split electrodes relatively small in electrode area is arranged adjacently to either the large split electrode section composed of the large split electrodes relatively large in electrode area, or the non-split electrode section in the metalized film width direction. Each of the small split electrodes is connected to one of the large split electrodes or the non-split electrode section through one of the fuses. For this reason, one end region of each of the small split electrodes is connected to either one of the large split electrodes larger in electrode area than the small split electrodes, or the non-split electrode section through one of the fuses. Thus, even when dielectric breakdown is generated in some of the small split electrodes, an electric current sufficient to cause the concerned fuses to act flows into the small split electrodes from the large split electrode or the non-split electrode section adjacent to these small split electrodes. As a result, these fuses are permitted to act certainly (to cause the vapor-deposited electrode in the fuse regions to scatter), so that the split electrodes where the dielectric breakdown is caused can be separated. In order to exhibit the above-mentioned advantageous effects, the area of the second split electrodes constituting the large split electrode section is preferably set to at least twice larger than that of the first split electrode section constituting the small split electrode section.

It is preferred to arrange, as the small split electrode section, two split electrode sections of a first small split electrode section and a second small split electrode section, and arrange the large split electrode section between the first and second small split electrode sections and adjacently thereto in the width direction of the metalized film. According to this structure, even when the dielectric body is deteriorated by heat, voltage or some other in the first or second small split electrode section so that, over some of the small split electrodes, their fuses act, the electric current path therein can be prevented from being extremely disturbed. In other words, if the non-split electrode section is arranged between the first and second small split electrode sections to be adjacent thereto in the film width direction, it is feared that the electric current path therein is extremely disturbed when over some of the small split electrodes their fuses act; this is because no insulating slits for dividing the vapor-deposited electrode are present in the non-split electrode section. As a result, the capacitor may undergo an extreme rise in dielectric loss and equivalent series resistance. Against this, the large split electrode section is arranged between the first and second small split electrode sections to be adjacent thereto in the metalized film width direction, thereby making it possible that the insulating slits formed in the large split electrode section regulate one or more electric current paths to prevent the electric current path from being extremely disturbed.

In the metalized film capacitor including the capacitor element made of a metalized film pair in which two of the metalized films are stacked onto each other, it is preferred that the electrode surfaces of the whole of the large split electrode section and the non-split electrode section formed in one of the paired metalized films are opposed to the small split electrode section formed in the other metalized film. According to this structure, even when one of the paired metalized films undergoes dielectric breakdown, which is caused beyond the self-restoring function (self-healing function) of the metalized film, in its large split electrode section or non-split electrode section, a sufficient electric current flows from the large split electrode, this large split electrode being larger in electrode area than the small split electrode, or non-split electrode section which is adjacent to the opposed small split electrode formed in the other of the paired metalized films to this split electrode. For this reason, the fuse formed at one end region of this small split electrode formed in the other of the paired metalized films acts certainly (to cause the vapor-deposited electrode at the fuse region to scatter), so that the large split electrode or non-split electrode section where the dielectric breakdown is generated can be separated from the other split electrodes. As a result of this effect, even when dielectric breakdown is caused in the large split electrode or the non-split electrode section formed in one of the paired metalized films, electric insulation of this large split electrode or non-split electrode section is restored so that the present element can maintain the function of a capacitor.

Furthermore, it is preferred that the non-split electrode section is arranged at the metallikon-connection section side of the metalized film for the following reason: if one of the split electrode sections is arranged at the metallikon-connection section side, the following may be caused when dielectric breakdown is generated in this split electrode section: the fuse for connecting this split electrode section to the non-split electrode section acts, so that an electric current path from this split electrode section is completely blocked. Thus, the element may come not to function as a capacitor. Against this, the non-split electrode section is arranged at the metallikon-connection section side, whereby the following is attained: even when dielectric breakdown is generated in the non-split electrode (the non-split electrode formed in one of the paired metalized films), the fuse acts, the fuse being a fuse for connecting one of the opposed small split electrode formed in the metalized film (the other metalized film out of the paired metalized films) to the non-split electrode or large split electrode adjacent to this small split electrode. This matter makes it possible that the present element keeps holding an electrode region functioning as a capacitor (so as to keep an electric current path from the non-split electrode).

Effect of the Invention

According to the invention, a metalized film capacitor can be provided which has good safety-keeping performance and voltage endurance performance at high temperatures.

BRIEF DESCRIPTION OF THE DRAWINGS

[FIG. 2] Each a plan view of a metalized film in the prior art in which split electrodes are laid. [FIG. 2-A] is a drawing illustrating a metalized film in which rectangular split electrodes are laid; [FIG. 2-B], one in which honeycombed split electrodes formed by Y-shaped insulating slits are laid; and [FIG. 2-C], one in which honeycombed split electrodes formed by Muller-Lyer-shaped insulating slits are laid.

[FIG. 26]

EMBODIMENTS FOR CARRYING OUT THE INVENTION

With reference to some of the drawings, examples according to the first aspect of the invention are first described in detail.

Figure 1:
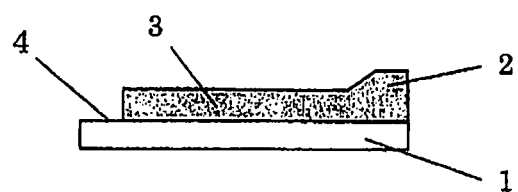
[FIG. 1] A drawing illustrating the layer structure of a metalized film used in a metalized film capacitor in the prior art.
Figure 3:
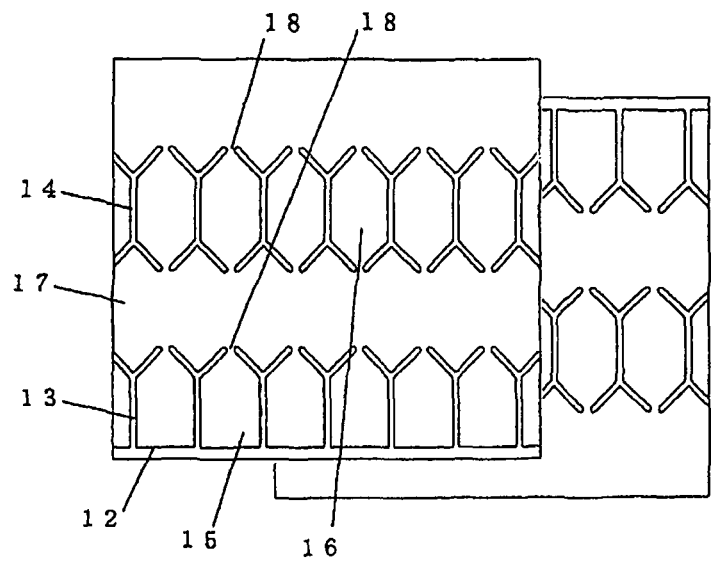
[FIG. 3] A plan view of an example of metalized films constituting the metalized film capacitor of the first aspect of the invention, wherein split electrodes and non-split electrodes are arranged to alternate the former with the latter.
Figure 4:
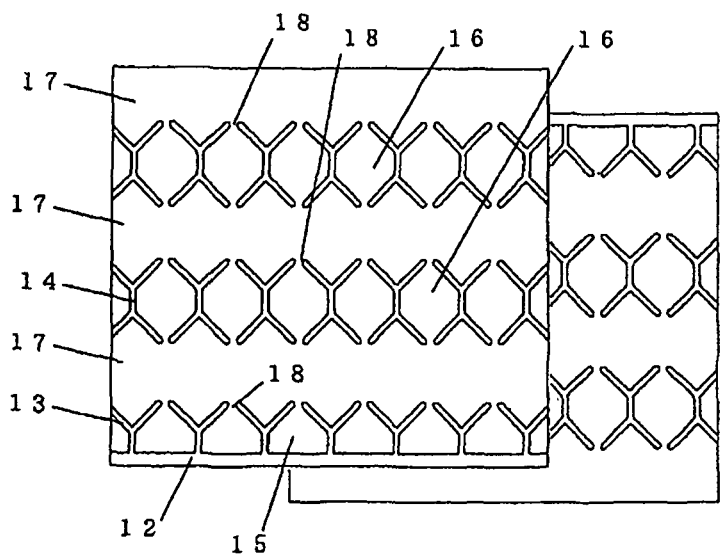
[FIG. 4] A plan view of another example of the metalized films constituting the metalized film capacitor of the first aspect of the invention, wherein split electrodes and non-split electrodes are arranged to alternate the former with the latter.
Figure 5:
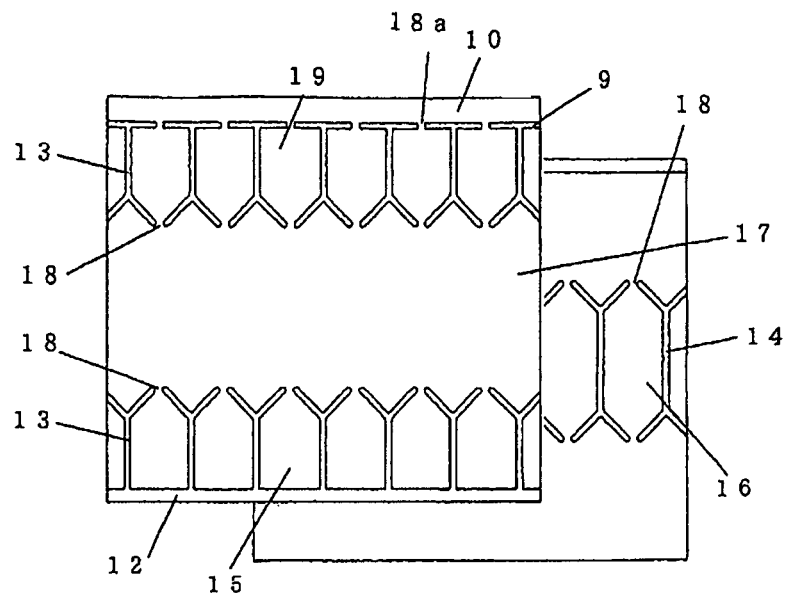
[FIG. 5] A plan view of still another example of the metalized films constituting the metalized film capacitor of the first aspect of the invention, wherein split electrodes and non-split electrodes are arranged to alternate the former with the latter.

As illustrated in FIGS. 3 to 5, in each of Examples 1 to 4, the following (i) and (ii) are attained: (i) one or more split electrode sections and one or more non-split electrode sections are arranged to alternate the split electrode section with the non-split electrode section in the film width direction of a metalized film, the former section being a section in which an vapor-deposited electrode (vapor-deposited metal) is divided into plural segments by plural insulating slits arranged at a regular pitch along the longitudinal direction of the metalized film, and the latter section being a section in which no insulating slit is present so that the vapor-deposited electrode is continuous in the longitudinal direction; and (ii) split electrodes corresponding to the segments of the split electrode section are connected to the non-split electrode section through fuses which are each formed between an end region of one of any adjacent two of the insulating slits, and an end region of the other.

EXAMPLE 1

"Y-Shaped+(One-Row) Muller-Lyer-Shaped" Insulating Slits in FIG. 3; Pitch: 12.0 mm FIG. 3 is a drawing illustrating an example of the metalized film capacitor according to the first aspect of the invention. In each of paired metalized films illustrated in FIG. 3, one (electrode forming region) of both end regions in the width direction of the metalized film constitutes a metallikon-connection section to which a metallikon for electrode-leading-out is to be connected. In the other end region, an insulating margin 12 is formed, which isgion where no vapor-deposited electrode is formed in one of both end regions in the width direction of the metalized film. At the insulating margin 12 side of the metalized film, plural Y-shaped insulating slits 13 (width: 0.2 mm) are arranged at a regular pitch in the longitudinal direction. Base end regions of the Y-shaped insulating slits 13 are jointed to the insulating margin 12. In a split electrode section having the thus-arranged Y-shaped insulating slits 13 (this section corresponds to the "first split electrode section" in the first aspect of the invention), an vapor-deposited electrode is divided into plural segments by the Y-shaped insulating slits 13, and split electrodes 15 are formed between the Y-shaped insulating slits 13. An electrode region sandwiched between an end region (at the metallikon-connection section side) of one of any adjacent two of the Y-shaped insulating slits 13 and an end region (at the metallikon-connection section side) of the other constitutes a fuse 18.

At the same pitch as the Y-shaped insulating slits 13 have, insulating slits 14 (width: 0.2 mm) in a Muller-Lyer-shaped form the slits being each in a form that a line segment extended into the width direction to have a predetermined length has, at each end thereof, an arrow directed toward the center of the segment) are arranged, in one row, in parallel with the arrangement direction of the Y-shaped insulating slits. In a split electrode section having the thus-arranged Muller-Lyer-shaped insulating slits 14 (this section corresponds to the "second split electrode section" in the first aspect of the invention), the vapor-deposited electrode is divided into segments by the Muller-Lyer-shaped insulating slits 14. Between the Muller-Lyer-shaped insulating slits 14 are formed split electrodes 16. Electrode regions sandwiched between ends (both ends) of one of any adjacent two of the Muller-Lyer-shaped insulating slits, and ends (both ends) of the other constitute a fuse 18.

Between the first split electrode section, and the second split electrode section, which faces the first split electrode section to be apart therefrom in the width direction, a non-split electrode section 17 is formed. In the non-split electrode section 17, no insulating slit is present so that the vapor-deposited electrode is formed to be continuous in the longitudinal direction.

While the split electrodes 15 formed by the division by the Y-shaped insulating slits 13 are connected to the non-split electrode section 17 through the fuses 18 each formed between any adjacent two of the Y-shaped insulating slits 13, the split electrodes 16 formed by the division by the Muller-Lyer-shaped insulating slits 14 are connected to the non-split electrode section 17 through the fuses 18 each formed between any adjacent two of the Muller-Lyer-shaped insulating slits 14.

The insulating slits 13 and 14, which divide the split electrodes 15 and 16, respectively, in the film longitudinal direction, were each made to have a pitch of 12.0 mm, and further the area of the split electrodes 15 was set to ½ of that of the split electrodes 16. The width of the fuses 18 through which the non-split electrode section 17 is connected to the split electrodes 15 or 16 was set to 0.2 mm. The used dielectric body was a polypropylene film 2.5 μm in thickness, and the film resistivity of the vapor-deposited electrode at the metallikon-connection section was set to 4 $\Omega/\square$, and that of the vapor-deposited electrode in the vicinity of a non-metallikon section, which is other than the metallikon-connection section, was set to 10 $\Omega/\square$.

Figure 7:
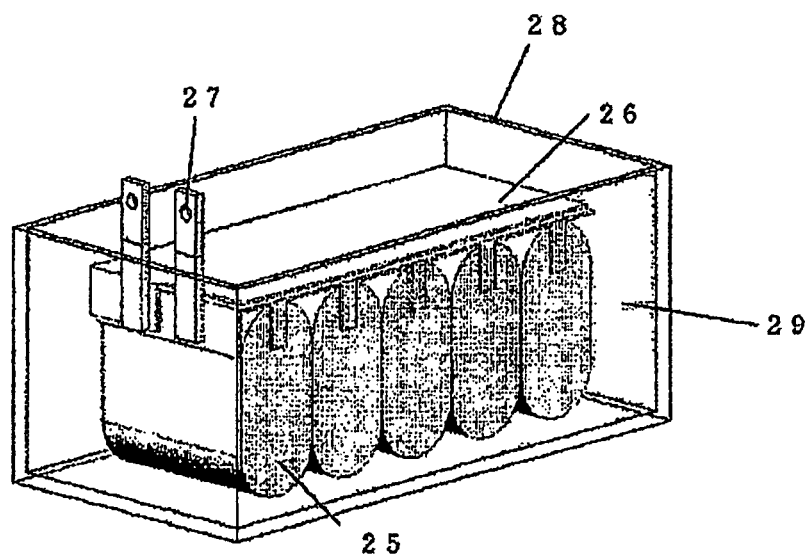
[FIG. 7] A drawing illustrating an internal structure of a metalized film capacitor of the invention.

The above-mentioned metalized films, the number of which is two, are put onto each other to oppose their metallikon-connection sections with their insulating margins, and then wound up, thereby forming a capacitor element. The two metalized films are put onto each other to face the electrode-formed surfaces thereof, in each of which the vapor-deposited electrode is formed, into the same direction. In other words, the vapor-deposited electrodes and the dielectric films are arranged to alternate the electrodes with the films in the direction in which these are stacked, so that one of the dielectric films is sandwiched between the vapor-deposited electrodes. The capacitor element is shaped into an elliptic form, and then a metallikon for electrode-leading-out is formed at each of both ends of the element to produce a capacitor element. Furthermore, as illustrated in FIG. 7, five capacitor elements 25 are connected to each other through an electrode plate 26, and then leading-out terminals 27 are connected thereto. The workpiece is then packed into a case 28, and the case is filled with an epoxy resin 29. The resin 29 is cured to produce five metalized film capacitors each having a capacity of 800 μF.

About one of the paired metalized films, where two metalized films are put onto each other, it is preferred that the whole of the non-split electrode sections formed in this film is opposed to the split electrode sections formed in the other metalized film. As illustrated in, for example, FIG. 12, according to this structure, even when one of the paired metalized films (the metalized film positioned at the upper side in the drawing) undergoes dielectric breakdown, which is caused beyond the self-restoring function (self-healing function) of the metalized film, in one of its non-split electrodes the dielectric body is broken at a site marked by "x") (even when the vapor-deposited electrodes in the paired metalized films are made conductive to each other through their broken dielectric sites), an electric current flows from the non-split electrode adjacent to the opposed split electrode formed on the other of the paired metalized films (the metalized film at the lower side in the drawing) (the non-split electrode is a non-split electrode that is made adjacent to this split electrode by alternating the non-split electrodes with the split electrodes in the width direction) to this split electrode. For this reason, the concerned fuse formed between the split electrode and the non-split electrodes formed in the other metalized film, out of the paired metalized films, acts (to cause the vapor-deposited electrode at the fuse region to scatter), so that the split electrode can be separated from the other split electrodes. As a result of this effect, even when dielectric breakdown is caused in one or more of the non-split electrodes formed in one of the paired metalized films, electric insulation of the concerned non-split electrode is restored so that the metalized films can maintain the function of a capacitor.

EXAMPLE 2

"Y-Shaped+(One-Row) Muller-Lyer-Shaped" Insulating Slits in FIG. 3; Pitch: 6.0 mm A metalized film capacitor was produced under the same conditions as in Example 1 except that the pitch of the insulating slits 13, as well as 14, for dividing the split electrodes 15, as well as 16, of the metalized films illustrated in FIG. 3 from each other in the film longitudinal direction was changed to 6.0 mm.

EXAMPLE 3

"Y-Shaped+(Two-Row) Muller-Lyer-Shaped" Insulating Slits in FIG. 4; Pitch: 6.0 mm In a metalized film capacitor illustrated in FIG. 4, Y-shaped insulating slits 13 are arranged at the insulating margin 12 side of each of metalized films, and at a regular pitch in the longitudinal direction thereof. Between the Y-shaped insulating slits 13 are formed split electrodes 15. At the same pitch as the Y-shaped insulating slits 13 has, Muller-Lyer-shaped insulating slits 14 in two rows are arranged in parallel with the arrangement direction of the Y-shaped insulating slits 13. Between the Muller-Lyer-shaped insulating slits 14 are formed split electrodes 16. Between a split electrode section (first split electrode section) where the Y-shaped insulating slits 13 are arranged and a split electrode section (second split electrode section) where one of the two rows of the Muller-Lyer-shaped insulating slits 14 is arranged oppositely to the first split electrode section so as to be apart therefrom in the width direction, as well as between this split electrode section (second split electrode section), where the one row of the Muller-Lyer-shaped insulating slits 14 is arranged, and a split electrode section (second split electrode section) where the other row of the Muller-Lyer-shaped insulating slits 14 is arranged oppositely to the Muller-Lyer-shaped insulating slits so as to be apart therefrom in the width direction, a non-split electrode section 17 is formed. Any one of the split electrodes 15 and the non-split electrode section 17 adjacent thereto, as well as any one of the split electrodes 16 and any one of the non-split electrode sections 17 adjacent thereto, are connected to each other through a fuse 18. As described just above, in this example, one of the non-split electrode sections 17 is formed between the plural second split electrode sections.

The metalized films illustrated in FIG. 4 were used, and the pitch of the insulating slits 13, as well as 14, for dividing the split electrodes 15, as well as 16, from each other in the film longitudinal direction was set to 6.0 mm. Furthermore, the area of the split electrodes 15 was set to ½ of that of the split electrodes 16. Under the same conditions as in Example 1 except the above, a metalized film capacitor was produced.

EXAMPLE 4

"(Two-Opposed-Row) Y-Shaped" Insulating Slits in FIG. 5; Pitch: 6.0 mm

In a metalized film capacitor illustrated in FIG. 5, Y-shaped insulating slits 13 are arranged at the insulating margin 12 side of one out of two metalized films and at a regular pitch in the longitudinal direction. Base end regions of the Y-shaped insulating slits 13 are jointed to the insulating margin 12. In a split electrode section having the Y-shaped insulating slits 13 arranged at the insulating margin 12 side as described just above (this section corresponds to the "insulating margin side split electrode section"), an vapor-deposited electrode is divided into plural segments by the Y-shaped insulating slits 13, and split electrodes 15 are formed between the Y-shaped insulating slits 13. An electrode region sandwiched between an end region (at the metallikon-connection section 10 side) of one of any adjacent two of the Y-shaped insulating slits 13 and an end region (at the metallikon-connection section 10 side) of the other constitutes a fuse 18.

Separately from the above, at the metallikon-connection section 10 side of the metalized film, plural Y-shaped insulating slits 13 different from the above-mentioned Y-shaped insulating slits 13 are arranged at a regular pitch in the longitudinal direction. In a split electrode section having the Y-shaped insulating slits 13 arranged at the metallikon-connection section side as described just above (this section corresponds to the "metallikon-connection section side split electrode section"), the vapor-deposited electrode is divided into plural segments by the Y-shaped insulating slits 13, and split electrodes 19 are formed between the Y-shaped insulating slits 13. Base end regions (metallikon-connection section side end regions) of the Y-shaped insulating slits 13 are jointed to insulating slits 9 extended into the longitudinal direction, respectively, these slits 9 being made in the Y-shaped insulating slits 13, respectively. An electrode region sandwiched between an end region (at the insulating margin side) of one of any adjacent two of the Y-shaped insulating slits 13 and an end region (at the insulating margin side) of the other constitutes a fuse 18.

Between the insulating margin side split electrode section and the metallikon-connection section side split electrode section is formed a non-split electrode section 17. Each of the split electrodes 15 formed at the insulating margin 12 side is connected to the non-split electrode section 17 through a fuse 18 formed between any adjacent two of the Y-shaped insulating slits 13 while each of the split electrodes 19 formed at the metallikon-connection section side is connected to the non-split electrode section 17 through a fuse 18 formed between any adjacent two of the Y-shaped insulating slits 13.

Fuses 18a are located also at the metallikon-connection section 10 side. The fuses 18a are formed between the insulating slits 9 extended into the longitudinal direction in a base region of the Y-shaped insulating slits 13 at the metallikon-connection section 10 side. Furthermore, at a central region in the width direction of the other metalized film, on which the above-mentioned metalized film is to be put, Muller-Lyer-shaped slits 14 are arranged at a regular pitch so that split electrodes 16 made of plural segments, respectively, are formed.

In the metalized film shown in FIG. 5, the pitch of the insulating slits 13, as well as 14, for dividing the split electrodes 15 and 19, as well as 16, from each other in the film longitudinal direction was set to 6.0 mm, and further the area of the split electrodes 15 and 19 was set to ½ of that of the split electrodes 16. The width of the fuses 18 for connecting the non-split electrodes 17 to the split electrodes was set to 0.2 mm, and that of the fuses at the metallikon-connection section side was set to 0.15 mm. Under the same conditions as in Example 1 except the above, a metalized film capacitor was produced.

COMPARATIVE EXAMPLE 1

Figure 6:
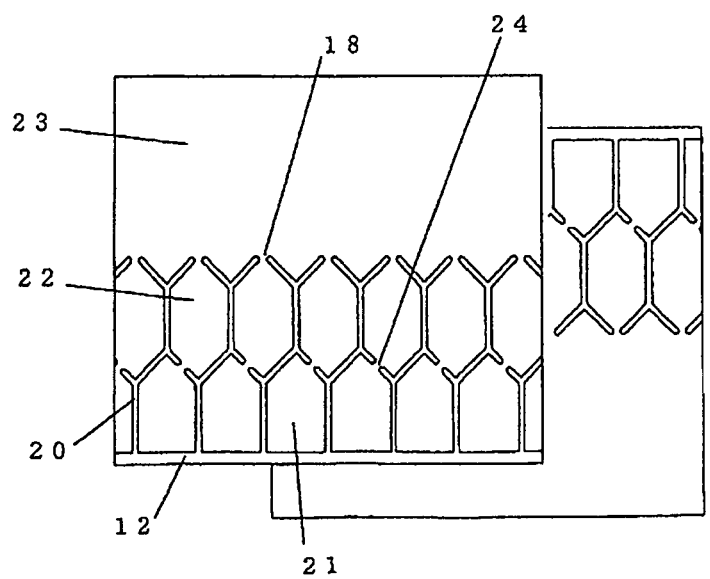
[FIG. 6] A plan view illustrating metalized films according to a comparative example wherein split electrodes are laid.

Y-Shaped/Muller-Lyer-Shaped Joint Insulating Slits in FIG. 6; Pitch: 12.0 mm

In each of metalized films illustrated in FIG. 6, insulating slits 20 are formed to be repeated in the longitudinal direction of the metalized film. The insulating slits 20 are each a slit where a Y-shaped insulating slit is formed at the insulating margin 12 side, and a Muller-Lyer-shaped insulating slit at a central region in the width direction of the metalized film is jointed to the Y-shaped insulating slit. Split electrodes 21, as well as split electrodes 22, which are segments divided by the insulating slits 20, are formed in a range corresponding to a half in the width direction of the metalized film (at the insulating margin 12 side thereof), and the area of the split electrodes 21 was set to ½ of that of the split electrodes 22. The other half in the width direction of the metalized film (at the metallikon-connection section side thereof) constitutes non-split electrodes 23.

The pitch of the insulating slits 20 for dividing the split electrodes 21, as well as 22, of the metalized film from each other into the longitudinal direction of the metalized film was set to 12.0 mm, and the width of the fuses 18 for connecting the non-split electrodes 23 to the split electrodes 22 was set to 0.2 mm. Under the same conditions as in Example 1 except the above, a metalized film capacitor was produced.

COMPARATIVE EXAMPLE 2

Y-Shaped/Muller-Lyer-Shaped Joint Insulating Slits in FIG. 6; Pitch: 6.0 mm

Under the same conditions as in Comparative Example 1 except that the pitch of the insulating slits 20 of the split electrode metalized films illustrated in FIG. 6 was changed to 6.0 mm, a metalized film capacitor was produced.

PRIOR ART EXAMPLE 1

Rectangular Insulating Slits in FIG. 2-A; Pitch: 6.0 mm

A metalized film capacitor was produced under the same conditions as in Example 1 except that the pitch of the insulating slits 5 for dividing the split electrodes 7 of the metalized film illustrated in FIG. 2-A from each other in the form of rectangles in the longitudinal direction was set to 6.0 mm; the area of the split electrodes was made equal to that of the split electrodes 16 in FIG. 4; and the width of the fuses 8 and 11 for connecting the split electrodes to each other was set to 0.2 mm.

PRIOR ART EXAMPLE 2

Formation of Honeycombed Split Electrodes by Use of Y-Shaped Insulating Slits in FIG. 2-B A metalized film capacitor was produced under the same conditions as in Example 1 except that the capacitor was permitted to have the honeycombed split electrodes 7a of the metalized film illustrated in FIG. 2-B; the area of the split electrodes was made equal to that of the split electrodes 16 in FIG. 4; and the width of the fuses 8a for connecting the split electrodes to each other was set to 0.2 mm.

PRIOR ART EXAMPLE 3

Formation of Honeycombed Split Electrodes by Use of Muller-Lyer-Shaped Insulating Slits in FIG. 2-C A metalized film capacitor was produced under the same conditions as in Example 1 except that the split electrodes 7b of the metalized film illustrated in FIG. 2-C were divided from each other in a honeycombed form by use of Muller-Lyer-shaped insulating slits; the area of the split electrodes was made equal to that of the split electrodes 16 in FIG. 4; and the width of the fuses 8b for connecting the split electrodes to each other was set to 0.2 mm.

About each of Examples 1 to 4, Comparative Examples 1 and 2, and Prior Art Examples 1 to 3, five samples were used to conduct a durability test (at a temperature of 120° C. under application of 750 V (DC) for 1000 hours) to measure a change ratio [%] in the electrostatic capacity of the samples. The test results are shown in Table 1.

Figure 8:
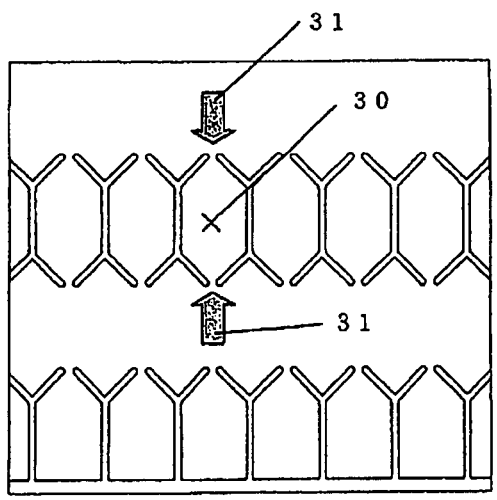
[FIG. 8] A view showing electric current paths when dielectric breakdown is caused at a position of a split electrode of a metalized film constituting a metalized film capacitor of the first aspect of the invention.
Figure 9:
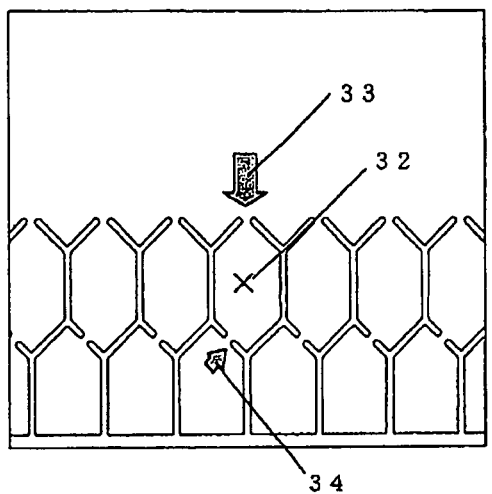
[FIG. 9] A view showing electric current paths when dielectric breakdown is caused at a position of a split electrode of a metalized film constituting a metalized film capacitor of a comparative example.

As is evident from Table 1, in Examples 1 to 4, no short circuit mode was observed at the time of the end of the test while in Comparative Examples 1 and 2 and Prior Art Examples 1 to 3, a short circuit mode was generated during the test even though the area of the split electrodes and the fuse dimension were equal to those in Examples 1 to 4. Each of examples has a structure wherein an vapor-deposited electrode is divided into plural split electrodes, the split electrodes are each connected to one or more non-split electrodes through one or more fuses, and the split electrode and the non-split electrode are arranged to alternate the split electrode with the non-split electrode in the film width direction; thus, when dielectric breakdown is generated in any one of its dielectric polypropylene films as illustrated in FIG. 8, sufficient electric currents 31 flow toward a dielectric breakdown site 30. As a result, even when the split electrodes are made small, the concerned fuses are permitted to act certainly (to cause the vapor-deposited electrode at portions of the fuses to scatter), so that the split electrodes are separated, whereby stable safety-keeping performance is obtained. By contrast, when dielectric breakdown is generated in a split electrode metalized film illustrated in FIG. 9, only a small electric current 34 flows toward a dielectric breakdown site 32 into fuses connected to the split electrode, so that these fuses can neither be scattered nor separated. Thus, a short circuit mode would be generated.

TABLE 1

| | Corresponding Drawing | Electrostatic capacity change ratio [%] after application of voltage of 750 V (DC) at 120° C. for 1000 hours | Safety-keeping performance | Pitch [mm] | Fuse width [mm] |
|---|---|---|---|---|---|
| Example 1 | FIG. 3 | −4.4 | Good | 12.0 | 0.2 |
| Example 2 | | −2.9 | Good | 6.0 | 0.2 |
| Example 3 | FIG. 4 | −2.1 | Good | 6.0 | 0.2 |
| Example 4 | FIG. 5 | −3.5 | Good | 6.0 | Y shape side: 0.2 Metallikon side: 0.15 |
| Comparative Example 1 | FIG. 6 | (Short circuit during test) | Poor | 12.0 | 0.2 |
| Comparative Example 2 | | (Short circuit during test) | Poor | 6.0 | 0.2 |
| Prior Art Example 1 | FIG. 2-A | (Short circuit during test) | Poor | 6.0 | 0.2 |
| Prior Art Example 2 | FIG. 2-B | (Short circuit during test) | Poor | — | 0.2 |
| Prior Art Example 3 | FIG. 2-C | (Short circuit during test) | Poor | — | 0.2 |

To form a split electrode metal, a masking oil is generally used. In each of Comparative Examples 1 and 2, a masking oil is slightly present at their split electrode side while no masking oil is present at their non-split electrode side. Thus, when a deviation exists in the width direction between the split electrodes and the non-split electrodes, a difference is generated in the frictional coefficient of the metalized film between these regions. Accordingly, a difference is generated in slipping property between the split electrodes and the non-split electrodes, so that at the time of winding up the element, the film is wrinkled. Following this matter, the safety-keeping performance of the element deteriorates at high temperatures.

By contrast, in an vapor-deposited pattern that one or more split electrodes and one or more non-split electrodes are arranged to alternate the split electrode with the non-split electrode as in each of examples, the positions of insulating slits in its metalized film are prevented from being unevenly located or distributed in the width direction, so that the slipping property can be made even in the width direction. Therefore, when the element is wound up, the element is restrained from being wrinkled, and further the safety-keeping performance is made stable at high temperatures. As a result, the productivity of such elements can also be improved. Thus, such examples make it possible to make a split electrode metalized film capacitor small in size, make the capacity reduction of the capacitor small when the capacitor is used at a high temperature over 100° C., and give stable safety-keeping performance to the capacitor.

Figure 14:
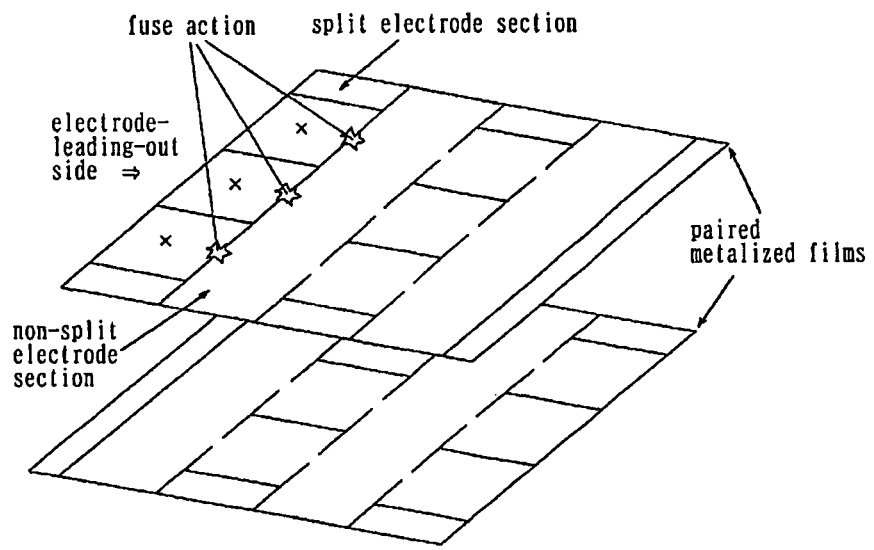
[FIG. 14] A drawing illustrating the state of stacked layers in a metalized film capacitor of a comparative example.

Furthermore, when two metalized films are put onto each other as described above, it is preferred that a non-split electrode section is arranged, for electrode-leading-out, at the metallikon-connection section side of each of the metalized films for the following reason: if a split electrode section is arranged at the metallikon-connection section side (electrode-leading-out side) as illustrated in FIG. 14, the following may be caused when dielectric breakdown is generated in this split electrode section (the dielectric body is broken at sites marked by "x" in its split electrodes): fuses for connecting this split electrode section to a non-split electrode section act, so that an electric current path from this split electrode section is completely blocked. Thus, the element may come not to function as a capacitor.

Figure 12:
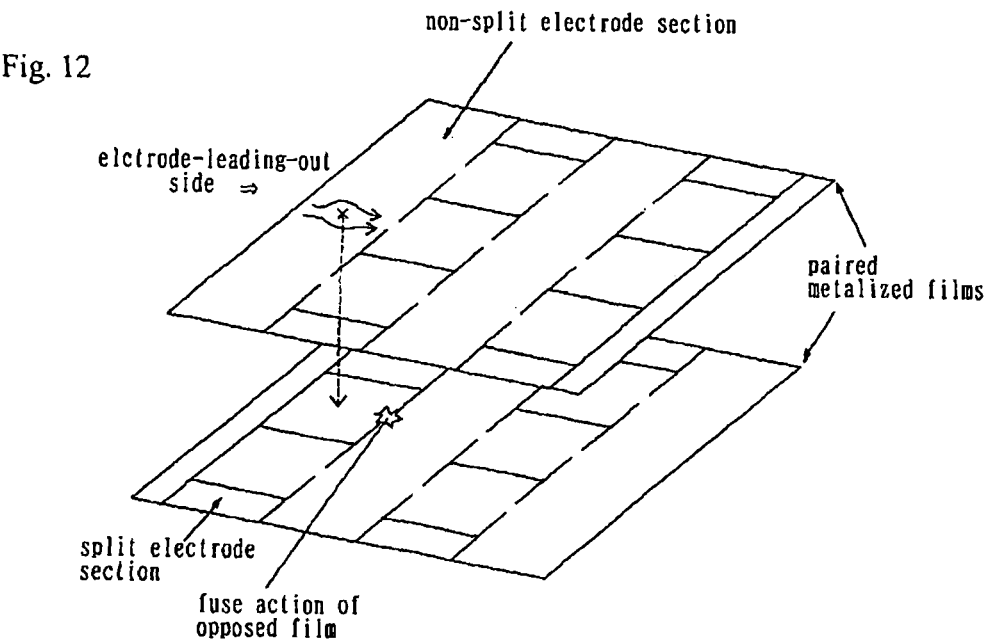
[FIG. 12] A drawing illustrating an example of the state of stacked layers in the metalized film capacitor of the first aspect of the invention.

Against this, one of the non-split electrode sections is arranged at the metallikon-connection section side as illustrated in FIG. 12. According to this manner, even when dielectric breakdown is generated in the non-split electrode at the electrode-leading-out side (the non-split electrode formed in one of the paired metalized films; in FIG. 12, one of the non-split electrodes formed in the metalized film at the upper side), a fuse acts, this fuse being a fuse for connecting the opposed split electrode formed in the metalized film (the other of the paired metalized films; in FIG. 12, the metalized film arranged at the lower side) to the non-split electrode adjacent to this split electrode. This matter makes it possible that the present element keeps holding an electrode region functioning as a capacitor (so as to maintain an electric current path from the non-split electrodes).

Figure 13:
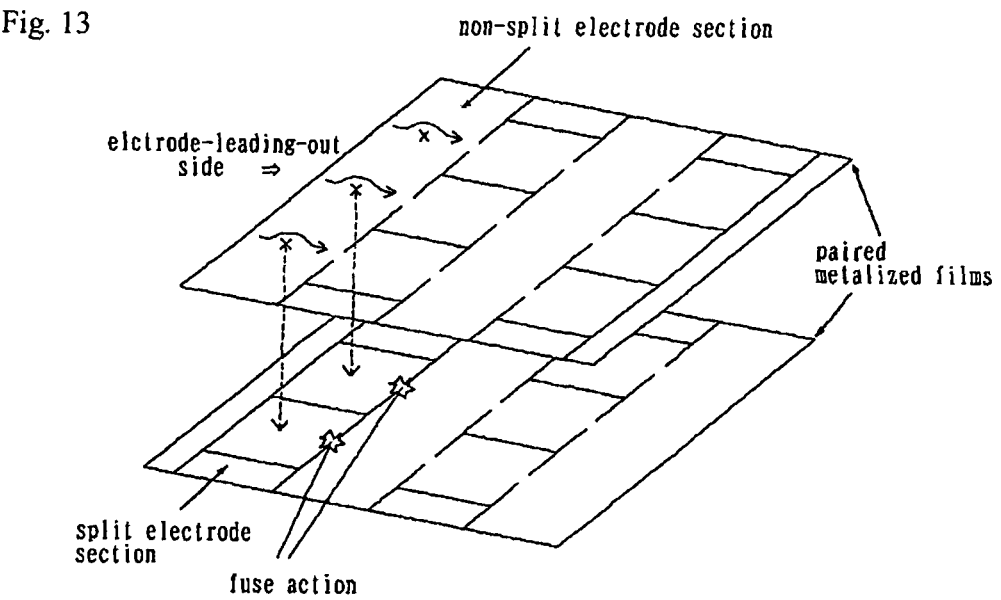
[FIG. 13] A drawing illustrating another example of the state of the stacked layers in the metalized film capacitor of the first aspect of the invention.

As illustrated in, for example, FIG. 13, even when dielectric breakdown is generated in plural sites of a non-split electrode (the dielectric body is broken at sites marked by "x" in the non-split electrode), the fuse action of the opposed metalized film makes it possible to separate electrode regions made conductive to each other between the upper and lower films from the other electrode regions, so that the element is permitted to function as a capacitor.

The invention is not limited to the above-mentioned embodiment, and may be variously changed into others than the embodiment as far as the resultant variations do not depart from the subject matter thereof. The metalized films illustrated in each of FIGS. 3 and 4 may each be formed to have the following structure: plural Y-shaped insulating slits are arranged in the longitudinal direction at the metallikon-connection section side, whereby the film further has a split electrode section where split electrodes are formed between the Y-shaped insulating slits (the section corresponds to the "third split electrode section" in the first aspect of the invention), and further a non-split electrode section is formed between the split electrode section (second split electrode section), where the split electrodes are formed between the Muller-Lyer-shaped insulating slits 14, and the third split electrode section. This structure makes it possible to decrease the capacity further and make the safety-keeping performance better.

Figure 10:
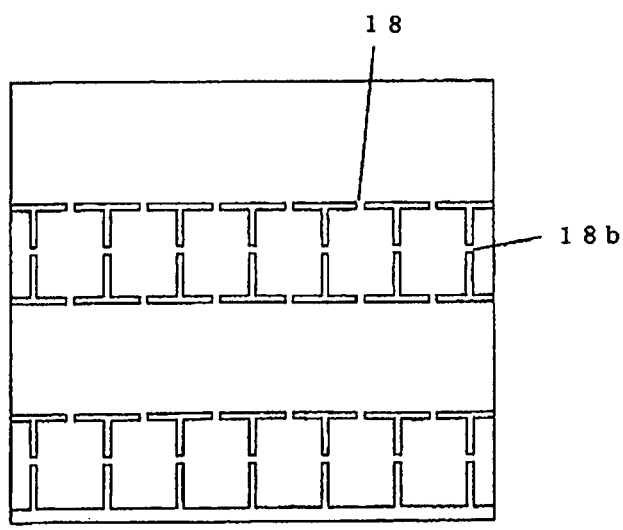
[FIG. 10] A drawing illustrating a varied example of one of the metalized films constituting the metalized film capacitor of the first aspect of the invention.
Figure 11:
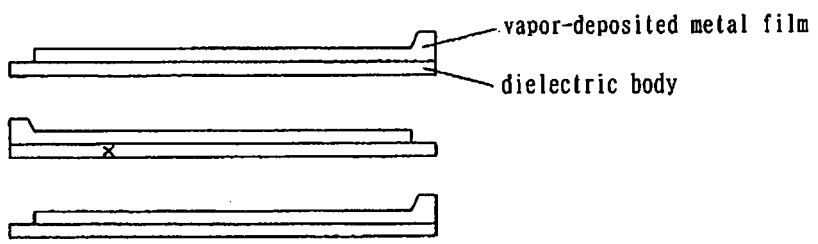
[FIG. 11] An example illustrating an example of the layer structure of a metalized film capacitor in the prior art.

In the above-mentioned embodiment, the fuses 18 are arranged in the width direction at a section for connection of a split electrode section to a non-split electrode section. As illustrated in FIG. 10, however, fuses 18b may each be formed to connect adjacent split electrodes between which an insulating slit is sandwiched to each other. Specifically, the fuses 18b may each be laid by cutting a central region of each insulating slit extended into the width direction partially, and forming an vapor-deposited electrode on the cut portion. In this case, it is preferred that the size of respective narrowest portions of the fuses 18b, which are each for connecting the split electrodes adjacent to each other in the longitudinal direction to each other, is smaller than that of respective narrowest portions of fuses 18 for connecting the split electrodes to the non-split electrode sections. This structure makes it possible to restrain a reduction in the capacity for the following reason: when dielectric breakdown is generated in one or more of the split electrode sections, the concerned fuse 18b scatters preferentially.

In the above-mentioned examples, cases have been shown where split electrodes are each made of a combination of Y-shaped forms (a pentagon), a combination of Muller-Lyer-shaped forms (a hexagon or honeycomb), or a variation of a honeycomb. However, cases where divided forms are repetitive forms similar to the above, such as rectangular forms, also gave a small reduction in the capacity and good safety-keeping performance in the same manner.

In the above-mentioned examples, their insulating slits are arranged at a regular pitch along the longitudinal direction. However, the arrangement thereof is not limited thereto. The insulating slits may be arranged at an irregular pitch or at will along the longitudinal direction.

Next, a description is made about embodiments of the metalized film capacitor of the second aspect of the invention with reference to some of the drawings.

Figure 15:
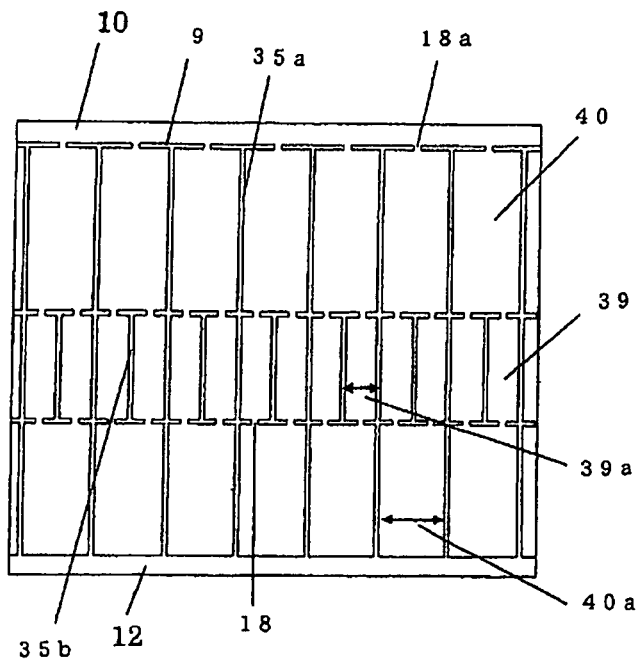
[FIG. 15] A drawing illustrating an embodiment of a metalized film constituting the metalized film capacitor of the second aspect of the invention.

FIG. 15 is a drawing illustrating an embodiment of a metalized film constituting the metalized film capacitor of the second aspect of the invention. In this metalized film, insulating slits 35a (in a T-shaped form) and insulating slits 35b (in an I-shaped form) are arranged to alternate the slits 35a with the slits 35b along the longitudinal direction of the metalized film; the slits 35a are formed over the substantially entire width of the metalized film other than a metallikon-connection section 10, and the slits 35b are formed in parallel with the insulating slits 35a at a central region in the width direction of the metalized film.

A first split electrode section (corresponding to the "central split electrode section" in the second aspect of the invention) is formed wherein an vapor-deposited electrode is divided into plural split electrodes 39 (hereinafter referred to as the "first split electrodes") by the insulating slits 35a and 35b. Moreover, at the outsides in the width direction of the first split electrode section (at both of the metallikon-connection section side and the insulating margin side), second split electrode sections (corresponding to the "outside split electrode sections" in the second aspect of the invention) are formed, respectively, wherein the vapor-deposited electrode is divided into plural split electrodes 40 (hereinafter referred to as the "second split electrodes") by individual pairs of the insulating slits 35a. In short, split electrode sections in three rows, the center thereof is the first split electrode section, are arranged in the width direction.

Each of the first split electrodes 39 is connected to each of the split electrodes (that is, the second split electrodes 40) adjacent thereto in the width direction through each of fuses 18 formed between the insulating slit 35a and the insulating slit 35b between which the split electrode 39 is sandwiched in the longitudinal direction. In other words, each of the second split electrodes 40 is connected to the first split electrode 39 adjacent thereto in the width direction through one of the fuses 18. In the vapor-deposited electrode in the vicinity of a metallikon-connection section, the metallikon-connection section 10 is separated from the second split electrodes 40 through insulating slits 9 extended along the longitudinal direction of the film. The metallikon-connection section 10 is connected to each of the second split electrodes 40 through a fuse 18a formed between any two of the insulating slits 9.

The interval between the insulating slits arranged in the first split electrode section, that is, the interval between any one of the insulating slits 35a and the insulating slit 35b adjacent thereto is smaller than the interval between the insulating slits 35a arranged in the second split electrode sections. The area of each of the first split electrodes 39, which constitute the first split electrode section, is smaller than that of each of the second split electrodes 40, which constitute the second split electrode sections.

In the same manner as in Example 1, two metalized films formed as described above are put onto each other to oppose their metallikon-connection sections with their insulating margins, and then wound up. The two metalized films are put onto each other to face the electrode-formed surfaces thereof, in each of which the vapor-deposited electrode is formed, into the same direction. In other words, the vapor-deposited electrodes and the dielectric films are arranged to alternate the electrodes with the films in the direction in which these are stacked, so that one of the dielectric films is sandwiched between the vapor-deposited electrodes. The wound body is shaped into an elliptic form, and then a metallikon for electrode-leading-out is formed at each of both ends of the wound body (one of the end regions of the metalized films put onto each other, and the other end region) to produce a capacitor element 25. Thereafter, a plurality of the capacitor elements 25 are connected to each other through an electrode plate 26, and then leading-out terminals 27 are connected thereto. The connected capacitor elements 25 are then packed into a case 28, and the case 28 is filled with a resin 29. In this way, a metalized film capacitor having the internal structure illustrated in FIG. 7 is yielded.

As described above, according to the present embodiment, the electrode area of each of the first split electrodes 39, which form the first split electrode section arranged in the central region in the film width direction, is smaller than that of each of the second split electrodes 40, which form the second split electrode sections arranged at the respective outsides in the width direction of the first split electrode section. For this reason, the number of the first split electrodes 39 is larger than that of the second split electrodes 40, so that the split electrodes in the central region of the capacitor element increase in number. As a result, the number of electric current paths increases in the central region of the capacitor element, so that the electric resistance of the element central region falls relatively. Since the quantity of generated heat of the element is in proportion to the electric resistance thereof, the fall in the electric resistance at the central region of the element makes it possible to restrain the temperature of the central region of the capacitor element from being raised by self-heating of the region. Thus, the voltage endurance performance of the metalized film capacitor can be improved, and the lifespan thereof can be made long.

Moreover, the interval between the insulating slits arranged in the first split electrode section, that is, the interval between any one of the insulating slits 35a and the insulating slits 35b is made smaller than the interval between the insulating slits 35a arranged in the second split electrode sections, whereby the film is restrained from becoming long in the width direction and simultaneously the area of the first split electrodes 39 can be made smaller than that of the second split electrodes 40.

Furthermore, at the time of forming the metalized film capacitor from the paired metalized films that are two metalized films put onto each other, it is preferred that the first split electrode sections formed in the paired metalized films, respectively, are overlapped with each other. According to this structure, the first split electrode sections overlap with each other, so that the first split electrodes 39 are arranged not only in the central region in the width direction of one of the opposed metalized films but also in the same region of the other film. As a result, the temperature of the central region of the capacitor element can be effectively restrained from being raised by self-heating of the region.

EXAMPLE 5

Hereinafter, a description is made about examples of the metalized film capacitor of the second aspect of the invention. In FIG. 15, the size 39a in the longitudinal direction of the first split electrodes 39 arranged near the center in the width direction of the metalized film was set to 5.0 mm, and the size 40a in the longitudinal direction of the second split electrodes 40 arranged in the other regions in the width direction was set to 10.0 mm. The size in the film width direction of the first split electrodes 39 was set to 15 mm, and that of the second split electrodes 40 was set to 20 mm. The size of the fuses 18 and 18a, for connecting the first split electrodes to the second split electrodes, was set to 0.2 mm. The used dielectric body was a polypropylene film 2.5 μm in thickness. The film resistivity of the vapor-deposited electrode in the vicinity of the non-metallikon section was set to 10 Ω/□, and that of the vapor-deposited electrode at the metallikon-connection section was set to 4 Ω/□.

Two metalized films formed as described above were put onto each other to oppose their metallikon-connection sections with their insulating margins, and then wound up. The wound body was shaped into an elliptic form, and then a metallikon for electrode-leading-out was formed at each of both ends of the wound body to produce a capacitor element. Furthermore, as illustrated in FIG. 7, five capacitor elements 25 were connected to each other through an electrode plate 26, and then leading-out terminals 27 were connected thereto. The connected capacitor elements 25 were then packed into a case 28. The case was filled with an epoxy resin 29, and the resin was cured. In this way, a metalized film capacitor having a capacity of 800 μF was produced.

COMPARATIVE EXAMPLE 3

Next, a description is made about a metalized film capacitor of a comparative example. The pitch of the insulating slits 5 for dividing the split electrodes 7 of the metalized film illustrated in FIG. 2 ([FIG. 2-A]) from each other in the film longitudinal direction was set to 10.0 mm, and that of the insulating slits 6 for dividing the insulating slits 7 from each other in the film width direction was set to 18 mm. The width of the fuses 8 and 11, for connecting the split electrodes 7 to each other, was set to 0.2 mm. The used dielectric body was a polypropylene film 2.5 μm in thickness. The film resistivity of the vapor-deposited electrode in the vicinity of the non-metallikon section was set to 10 Ω/□, and that of the vapor-deposited electrode at the metallikon-connection section was set to 4 Ω/□.

This split electrode metalized film, and the same metalized film were put onto each other to oppose their metallikon-connection sections to their insulating margins, and then wound up. The wound body was shaped into an elliptic form, and then a metallikon for electrode-leading-out was formed at each of both ends of the wound body to produce a capacitor element. Furthermore, as illustrated in FIG. 7, five capacitor elements 25 were connected to each other through an electrode plate 26, and then leading-out terminals 27 were connected thereto. The connected capacitor elements 25 were then packed into a case 28. The case was filled with an epoxy resin 29, and the resin was cured. In this way, a metalized film capacitor having a capacity of 800 μF was produced.

About each of Example 5 and Comparative Example 3, five samples were prepared, and then used to conduct a temperature rise test (under application of a 100-A electric current having a frequency of 10 kHz from a temperature of 100° C.) and a durability test (at a temperature of 110° C. under application of 750 V (DC) for 1000 hours). After the end of the tests, the change ratio in the electrostatic capacity of the samples was measured. The test results are shown in Table 2.

As is evident from Table 2, comparing Example 5 and Comparative Example 3 with each other, the temperature rise value in Example 5 is smaller at the time of the application of the electric current. This is because in Example 5 the first split electrodes (small-area split electrodes) are arranged in the central region in the width direction of the metalized films, thereby making it possible to restrain the temperature of the central region of each of the capacitor elements from being raised by self-heating of the region. Specifically, in the central region in the width direction of the films, the split electrodes that are relatively small in electrode area are arranged, whereby the number of electric current paths increases in the central region of the capacitor element, so that the electric resistance of the element central region lowers relatively. This matter makes it possible that heat generation resulting from an electric current is decreased in the central region of the capacitor element. As a result, in Example 5, a rise in the temperature can be relatively restrained than in Comparative Example 3.

According to the comparison of Example 5 with Comparative Example 3, it is also understood from the test results in Table 2 that in Example 5 the value of a reduction in the electrostatic capacity is smaller after the durability test than in Comparative Example 3. This is because the self-heating of the capacitors is decreased as described above, thereby making an improvement in the voltage endurance performance of the capacitors.

TABLE 2

|  |  | Temperature rise value (° C.) at application of electric current | Electrostatic capacity change ratio (%) after durability test |
|---|---|---|---|
| Example 5 | No. 1 | 5.8 | −2.5 |
|  | No. 2 | 5.4 | −3.2 |
|  | No. 3 | 5.6 | −2.8 |
|  | No. 4 | 5.2 | −2.7 |
|  | No. 5 | 5.9 | −3.3 |
|  | Ave. | 5.6 | −2.9 |
| Comparative Example 3 | No. 1 | 7.2 | −5.6 |
|  | No. 2 | 6.9 | −6.5 |
|  | No. 3 | 6.8 | −6.9 |
|  | No. 4 | 7.4 | −5.7 |
|  | No. 5 | 6.7 | −6.1 |
|  | Ave. | 7.0 | −6.2 |

Figure 16:
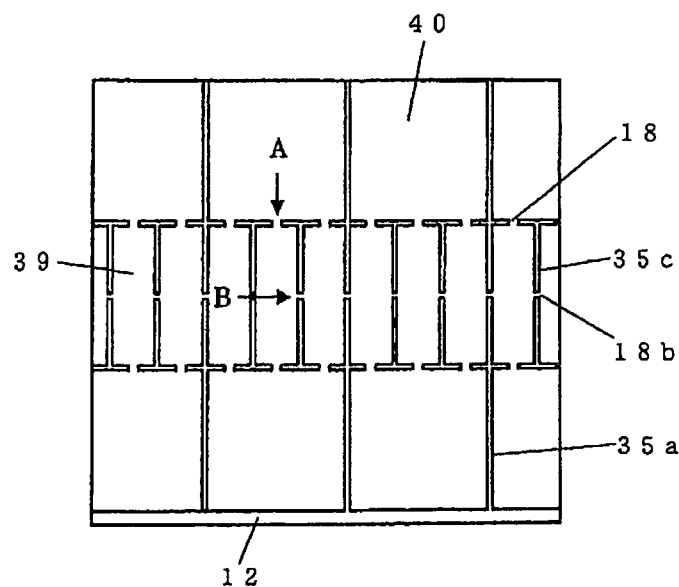
[FIG. 16] A drawing illustrating another embodiment of the metalized film constituting the metalized film capacitor of the second aspect of the invention.

FIG. 16 is a drawing illustrating another embodiment of the metalized film constituting the metalized film capacitor of the second aspect of the invention. This embodiment is largely different from the embodiment illustrated in FIG. 15 in that first split electrodes 39 that constitute a first split electrode section arranged in a central region in the width direction of the film are connected to each other through fuses 18b. The other structural factors are basically equivalent to those of the embodiment illustrated in FIG. 15. Thus, any description of common points therebetween is omitted, and the differences are described.

Any adjacent two of the first split electrodes 39, between which an insulating slit 35c arranged in the first split electrode section (central split electrode section) is sandwiched in the longitudinal direction, are connected to each other through a fuse 18b. The width A of fuses for connecting first split electrodes 39 that form the first split electrode section to second split electrodes 40 that form each second split electrode section is larger than the width B of the fuses 18b for connecting the first split electrodes 39 to each other.

The above-mentioned structure makes it possible that an electric current flows through the fuses 18b to increase the number of electric current paths in the central region of the capacitor element. Thus, the self-heating can be further restrained. The width of the fuses 18 is made larger than that of the fuses 18b, whereby sufficient fuse-acting performance can be certainly kept in the central split electrodes, which are each small in split electrode area so as to be small in energy for acting the related fuses.

The second aspect of the invention is not limited to the above-mentioned embodiments, and may be variously changed into others than the embodiments as far as the resultant variations do not depart from the subject matter thereof. In the above-mentioned embodiments, for example, the respective electrode areas of the first split electrodes 39 are made equal to each other; however, the electrode areas may be made different from each other. In the same way, the respective electrode areas of the second split electrodes 40 (at the metallikon-connection section side and the insulating margin side) are made equal to each other; however, the electrode areas may be made different from each other. In essence, the area of each of the split electrodes that form the central split electrode section arranged in the central region in the width direction needs only to be smaller than that of each of the split electrodes that form the outside split electrode sections arranged at the outsides in the width direction of the central split electrode section, respectively.

When two metalized films are put onto each other, these metalized films may be metalized films having the same electrode pattern or may be metalized films having electrode patterns different from each other. In this case also, it is preferred to put the metalized films onto each other to oppose their central split electrode sections composed of split electrodes smallest in electrode area to each other. This manner makes it possible to restrain effectively the temperature of the central region of the capacitor element from being raised by self-heating of the region.

In the above-mentioned embodiments, split electrode sections, in which an vapor-deposited electrode is divided into plural split electrodes by insulating slits arranged in the longitudinal direction of a metalized film and at intervals, are arranged in three rows in the width direction; however, the number of arranged rows of split electrode sections is not limited thereto. As illustrated in, for example, FIG. 17, a metalized film may be formed.

Figure 17:
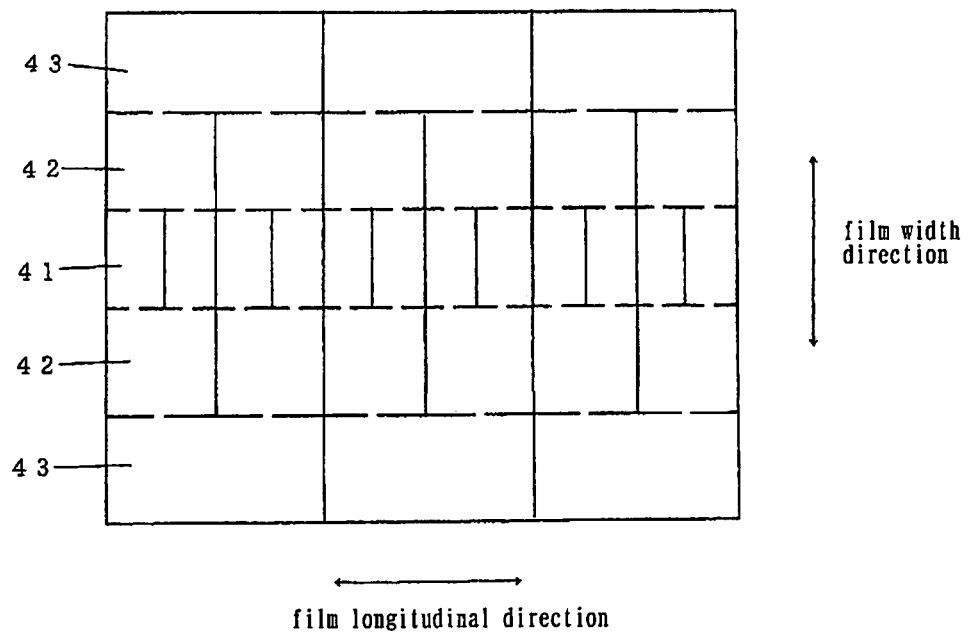
[FIG. 17] A drawing illustrating a varied form of the metalized film constituting the metalized film capacitor of the second aspect of the invention.

FIG. 17 is a drawing illustrating a varied form of a metalized film constituting the metalized film capacitor of the second aspect of the invention. In FIG. 17, split electrode sections are arranged in five rows along the width direction. Specifically, the following are arranged in the width direction: a central split electrode section composed of plural split electrodes 41 and arranged at a central region in the width direction; first outside split electrode sections composed of plural split electrodes 42 to be at respective width-direction outsides of the central split electrode section; and second outside split electrode sections composed of plural split electrodes 43 to be at respective width-direction outsides of the first outside split electrode sections. The individual split electrodes constituting the split electrode sections are connected to each other through fuses (not illustrated). The electrode area of the split electrodes 41 is smaller than that of the split electrodes 42, and the electrode area of the split electrodes 42 is smaller than that of each of the split electrodes 43.

Such a structure also attains an increase in the number of electric current paths at the central region of the capacitor element so that the electric resistance at the central region of the element falls since the area of each of the split electrodes constituting the central split electrode section, which is arranged at the central region in the width direction, is smaller than that of each of the split electrodes constituting the outside split electrode sections arranged at the respective width-direction outsides of the central split electrode section. This matter makes it possible to restrain the temperature of the central region of the capacitor element from being raised by self-heating of the region.

In FIG. 17, the second outside split electrode sections, which are composed of the split electrodes 43 and arranged at the outermost sides in the film width direction, may each be not any section made of vapor-deposited electrodes divided into each other by insulating slits, but a non-split electrode section.

Figure 18:
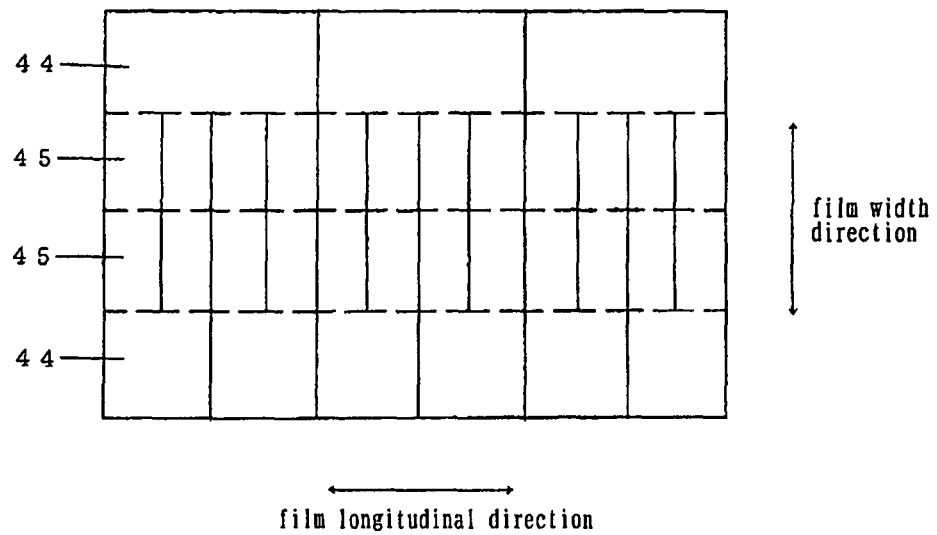
[FIG. 18] A drawing illustrating another varied form of the metalized film constituting the metalized film capacitor of the second aspect of the invention.

The metalized film is not limited to any case where its split electrode sections are arranged in rows the number of which is odd in the width direction; thus, the film may have a structure wherein its split electrode sections are arranged in rows the number of which is even. FIG. 18 illustrates an example in which split electrode sections are arranged in four rows in the width direction. In the metalized film illustrated in FIG. 18, at a central region in the width direction thereof, central split electrode sections are arranged in two rows in the width direction, the sections being each composed of split electrodes 45 each having a smaller electrode area than that of each of split electrode sections 44 constituting outside split electrode sections arranged at respective width-direction outsides. Such a structure attains an increase in the number of electric current paths at the central region of the capacitor element so that the electric resistance at the central region of the element falls since the central split electrode sections are arranged to sandwich the center in the width direction of the film therebetween. This matter makes it possible to restrain the temperature of the central region of the capacitor element from being raised by self-heating of the central region.

Figure 19:
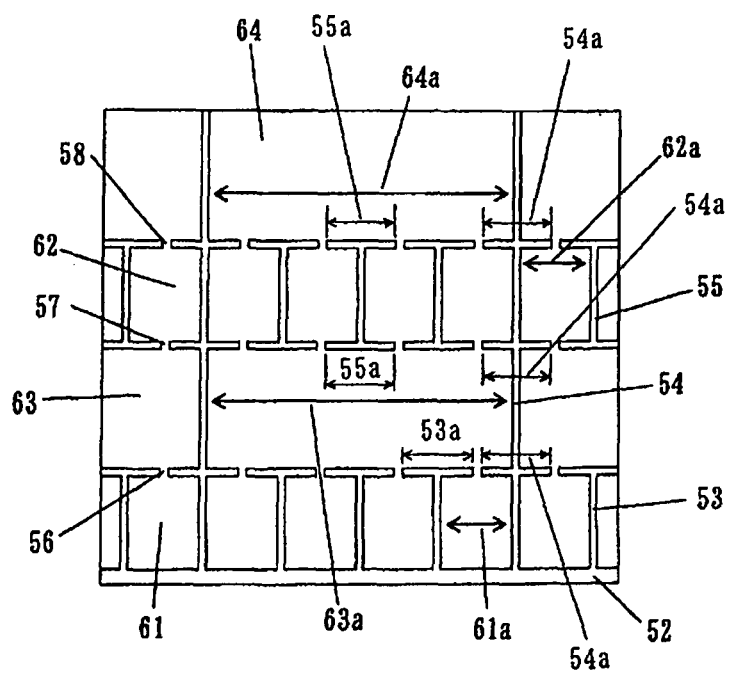
[FIG. 19] A drawing illustrating an embodiment of one of paired metalized films constituting the metalized film capacitor of the third aspect of the invention.

FIG. 19 is a drawing illustrating a first embodiment of a metalized film constituting the metalized film capacitor of the third aspect of the invention. In this metalized film, one (electrode forming region) of both end regions in the width direction of the metalized film constitutes a metallikon-connection section to which a metallikon for electrode-leading-out is to be connected. In the other end region, an insulating margin 52 is formed, which isgion where no vapor-deposited electrode is formed in one of both the end regions in the width direction of the metalized film. At the insulating margin 52 side of the metalized film, T-shaped insulating slits 53 are arranged at regular intervals in the longitudinal direction. At a predetermined interval in the film width direction from the insulating slits 53, plural insulating slits 55 are arranged at regular intervals in the longitudinal direction to have the same pitch as the insulating slits 53. Between certain slit-pairs of the insulating slits 53, as well as between the insulating slits 55, penetrating type insulating slits 54 are made to penetrate the film in the width direction (to connect the insulating margin 52 and the metallikon-connection section to each other). The insulating slits 54 are arranged in the longitudinal direction of the film in such a manner that three of the insulating slits 53, as well as three of the insulating slits 55, are sandwiched between the slits 54. The slit width of the insulating slits 53, 54 and 55 is set to, for example, 0.2 mm. In the individual insulating slits 53, 54 and 55, the respective lengths of slit portions extending into the film longitudinal direction (the length 53a of the insulating slits 53, the length 54a of the insulating slits 54, and the length 55a of the insulating slits 55) are equal to each other.

Between the insulating slits 53, as well as between the insulating slits 54 and the insulating slits 53 (adjacent thereto, respectively), are formed split electrodes 61 (corresponding to the "first split electrodes" in the third aspect of the invention), which are electrodes divided from an vapor-deposited electrode. These split electrodes 61 constitute a first small split electrode section. Moreover, between the insulating slits 55, as well as between the insulating slits 54 and the insulating slits 55 (adjacent thereto, respectively) are formed split electrodes 62 (corresponding to the "first split electrodes" in the third aspect of the invention), which are electrodes divided from the vapor-deposited electrode. These split electrodes 62 constitute a second small split electrode section. Furthermore, by the insulating slits 54, the vapor-deposited electrode is divided into plural split electrodes 63 and 64 (corresponding to the "second split electrodes" in the third aspect of the invention). Specifically, in the film width direction, a first large split electrode section composed of the split electrodes 63 is formed between the first small split electrode section and the second small split electrode section, and a second large split electrode section composed of the split electrodes 64 is formed at the metallikon-connection section side.

About these four split electrode sections, along the film width direction from the insulating margin 52 side to the metallikon-connection section thereof, the first small split electrode section, the first large split electrode section, the second small split electrode section, and the second large split electrode section are arranged in this order, so that the small split electrode sections and the large split electrode sections are arranged to alternate the former sections with the latter sections. In other words, in the film width direction, the small split electrode sections are each arranged adjacently to one or two of the large split electrode sections. Each of the split electrodes 61 is connected to one of the split electrodes 63 through a fuse 56 formed between any adjacent two of the insulating slits 53, between which the split electrode 61 is sandwiched in the longitudinal direction, as well as through a fuse 56 between one of the insulating slits 54 and the insulating slit 53. Each of the split electrodes 62 is connected to one of the split electrodes 63, as well as to one of the split electrodes 64, through a fuse 57, as well as through a fuse 58, this fuse 57 being formed between any adjacent two of the insulating slits 55, between which the split electrode 62 is sandwiched in the longitudinal direction, and the fuse 58 being formed between one of the insulating slits 54 and the insulating slit 55 adjacent thereto.

The interval between the insulating slits arranged in the first small split electrode section, that is, the interval between the insulating slits 53, as well as between each of the insulating slits 54 and the insulating slit 53 adjacent thereto, is smaller than that between the insulating slits 54 arranged in the first large split electrode section. The electrode area of the split electrodes 63 constituting the first large split electrode section is larger than that of the split electrodes 61 constituting the first small split electrode section. Moreover, the interval between the insulating slits arranged in the second small split electrode section, that is, the interval between the insulating slits 55, as well as between each of the insulating slit 54 and the insulating slit 55 adjacent thereto, is smaller than that between the insulating slits 54 arranged in the first large split electrode section, as well as that between the insulating slits 54 arranged in the second large split electrode section. The electrode area of the split electrodes 63 and 64 constituting the first large split electrode section and the second large split electrode section, respectively, is larger than the electrode area of the split electrodes 61 and 62 constituting the first and second small split electrode sections, respectively.

Two metalized films formed as described above are put onto each other to oppose their metallikon-connection sections to their insulating margins, and then wound up. As illustrated in FIG. 7, the wound metalized films are shaped into an elliptic form, and then a metallikon for electrode-leading-out is formed at each of both ends of the wound body to produce a capacitor element 25. Furthermore, plural capacitor elements 25 are connected to each other through an electrode plate 26, and then leading-out terminals 27 are connected thereto. The connected capacitor elements 25 are then packed into a case 28. The case is filled with a resin 29. In this way, a metalized film capacitor is produced.

As described above, according to this embodiment, in the width direction of the metalized film, the small split electrode sections composed of the split electrodes (first split electrodes) 61 and 62 are adjacent to one or more of the large split electrode sections composed of the split electrodes (second split electrodes) 63 and 64. For this reason, at least one of the end regions of each of the first split electrodes 61 and 62 is connected through one of the fuses to one of the second split electrodes 63 and 64 larger in electrode area than the first split electrodes 61 and 62. Therefore, even when dielectric breakdown is generated in some of the first split electrodes 61 or 62, an electric current sufficient to cause the concerned fuses to act flows into the first split electrodes 61 or 62 from the second split electrodes 63 or 64 adjacent to the first split electrodes 61 or 62, so as to permit the fuses to act certainly (to cause the vapor-deposited electrode in the fuse regions to scatter). As a result, the split electrodes where the dielectric breakdown is caused can be separated. This matter makes it possible that the capacitor gains stable safety-keeping performance even when the split electrodes are made small.

Furthermore, the small split electrode sections and the large split electrode sections are arranged to alternate the former sections with the latter sections in the width direction of each of the metalized films; thus, the positions of the insulating slits in the metalized film are prevented from being unevenly located in the width direction, so that the slipping property of the metalized film can be made even in the width direction. As a result, when the metalized films are wound, the film-wound element is restrained from coming into an uneven state, so that the element can certainly keep good voltage endurance performance at high temperatures.

The interval between the insulating slits arranged in the small split electrode sections (the interval between the insulating slits 54 and the insulating slits 53 adjacent thereto, respectively as well as that between the insulating slits 54 and the insulating slits 55 adjacent thereto, respectively) is made smaller than that between the insulating slits arranged in the large split electrode sections (the interval between the insulating slits 54 as well as that between the insulating slits 55), thereby making it possible to make the area of the first split electrodes 61 as well as 62 smaller than that of the second split electrodes 63 as well as 64 while each of the films is restrained from becoming long in the width direction.

Figure 20:
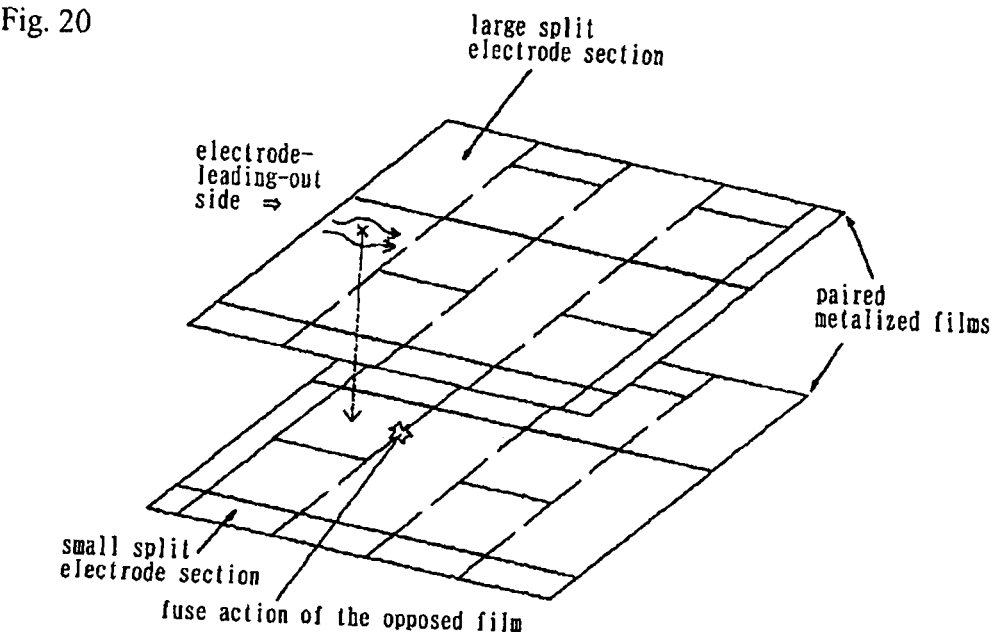
[FIG. 20] A drawing showing electric current paths when dielectric breakdown is caused at a split electrode position of one of paired metalized films constituting a metalized film capacitor of the third aspect of the invention.

Furthermore, when the metalized film capacitor is formed from paired metalized films that are two metalized films put onto each other, it is preferred that the whole of one or more large split electrode sections formed in one of the paired metalized films is opposed to one or more small split electrode sections formed in the other metalized film. As illustrated in, for example, FIG. 20, according to this structure, even when dielectric breakdown is caused beyond the self-restoring function (self-healing function) of the metalized film, in one of its second split electrodes (the metalized film positioned at the upper side in the drawing) (the dielectric body is broken at a site marked by "x") (even when the vapor-deposited electrodes in the paired metalized films are made conductive to each other through the broken dielectric site), an electric current flows from the second split electrode adjacent to the opposed first split electrode formed on the other of the paired metalized films (the metalized film at the lower side in the drawing), the second split electrode being larger in electrode area than this first split electrode, into this first split electrode. For this reason, the concerned fuse acts certainly, this fuse being a fuse formed between this first split electrode and this second split electrode formed in the other metalized film of the paired metalized films, (to cause the vapor-deposited electrode at the fuse region to scatter). Thus, the second split electrode can be separated from the other split electrodes. As a result of this effect, even when dielectric breakdown is caused in any one of the second split electrodes formed in one of the paired metalized films, electric insulation of this second split electrodes is restored so that the element can maintain the function of a capacitor.

Figure 21:
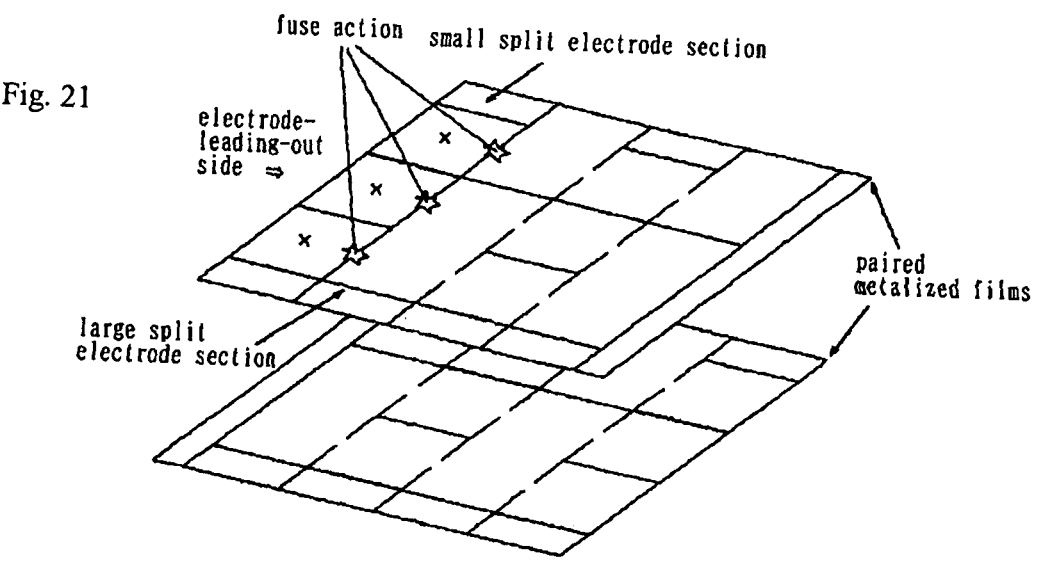
[FIG. 21] A drawing showing electric current paths when dielectric breakdown is caused at split electrode positions of one of paired metalized films constituting a metalized film capacitor of a comparative example.

Furthermore, when the above-mentioned two metalized films are put onto each other, it is preferred that the large split electrode section is arranged, for electrode-leading-out, at the metallikon-connection section side of each of the metalized films for the following reason: if a small split electrode section is arranged at the metallikon-connection section side (electrode-leading-out side) as illustrated in FIG. 21, the following may be caused when dielectric breakdown is generated in some of first split electrodes constituting this small split electrode section (the dielectric body is broken at sites marked by "x" in the split electrodes): fuses for connecting these first split electrodes to the concerned second electrode act, so that an electric current path from the first split electrodes is completely blocked. Thus, the element may come not to function as a capacitor. Against this, the large split electrode section is arranged at the metallikon-connection section side, whereby the following is attained: even when dielectric breakdown is generated in one of the second split electrodes at the electrode-leading-out side (the second split electrodes constituting one of the large split electrode sections formed in one of the paired metalized films), the concerned fuse act, this fuse being a fuse for connecting the opposed first split electrode formed in the metalized film (the other of the paired metalized films; in FIG. 20, the metalized film arranged at the lower side) to the second split electrode adjacent to this first split electrode. This matter makes it possible that the present element keeps holding an electrode region functioning as a capacitor.

EXAMPLE 6

Hereinafter, a description is made about examples of the metalized film capacitor of the third aspect of the invention. In FIG. 19, the respective sizes 61*a* and 62*a* in the longitudinal direction of the first split electrodes 61 and 62 constituting the small split electrode sections were each set to 5 mm; the respective sizes 63*a* and 64*a* in the longitudinal direction of the second split electrodes 63 and 64 constituting the large split electrode sections, 20 mm; the respective sizes in the film width direction of the first split electrodes 61 and 62, 23 mm; and the respective sizes in the same direction of the second split electrodes 63 and 64, 26 mm. The respective sizes of the fuses 56 to 58 for connecting the first electrodes to the second split electrodes were each set to 0.2 mm. The used dielectric bodies were each a polypropylene film 2.5 μm in thickness. The film resistivity of the vapor-deposited electrode in the vicinity of the non-metallikon section was set to 10 Ω/□, and that of the vapor-deposited electrode at the metallikon-connection section was set to 4 Ω/□.

The thus-formed two metalized films were put onto each other to oppose their metallikon-connection sections with their insulating margins, and then wound up. The wound body was shaped into an elliptic form, and then a metallikon for electrode-leading-out was formed at each of both ends of the wound body to produce a capacitor element. Furthermore, as illustrated in FIG. 7, five capacitor elements 25 were connected to each other through an electrode plate 26, and then leading-out terminals 27 were connected thereto. The connected capacitor elements 25 were then packed into a case 28. The case was filled with an epoxy resin 29, and the resin was cured. In this way, a metalized film capacitor having a capacity of 800 μF was produced.

Figure 22:
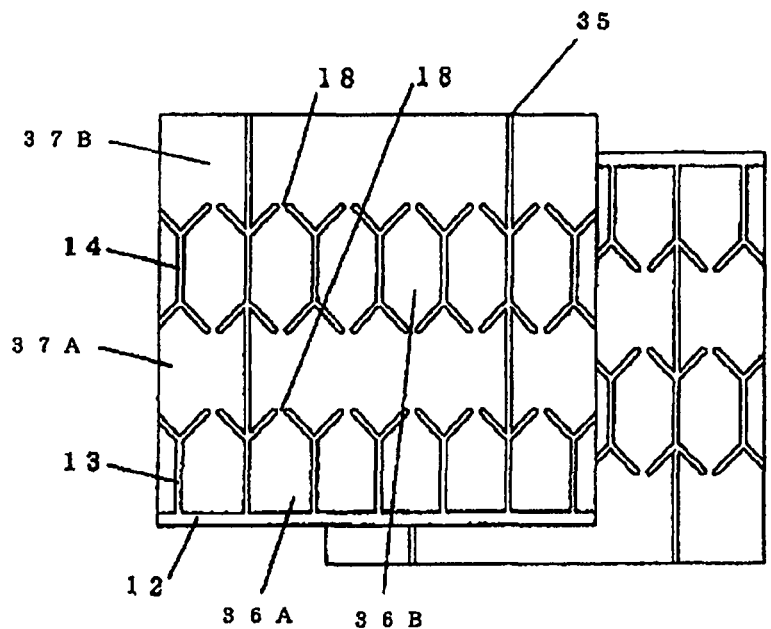
[FIG. 22] A drawing illustrating another embodiment of the metalized films constituting the metalized film capacitor of the third aspect of the invention.

FIG. 22 is a drawing illustrating a different embodiment of the metalized film constituting the metalized film capacitor of the third aspect of the invention. This embodiment is largely different from the above-mentioned embodiment in that an vapor-deposited electrode is divided by insulating slits different in shape from those in the above-mentioned embodiment (in FIG. 19) to form first split electrodes, and second split electrodes larger in electrode area than the first split electrodes.

In each of the metalized films according to this different embodiment, first split electrodes 36A and 36B are formed by plural Muller-Lyer-shaped insulating slits 14 (the slits being each in a form that a line segment extended into the width direction to have a predetermined length has, at each end thereof, an arrow directed toward the center of the segment) arranged, in the middle of the film width direction, in the longitudinal direction, and Y-shaped insulating slits 13 arranged, at the insulating margin 12 side, in the longitudinal direction, respectively. The Y-shaped insulating slits 13 and the Muller-Lyer-shaped insulating slits 14 are arranged at the same pitch in the longitudinal direction. One or more of the Y-shaped insulating slits 13 as well as one or more of the Muller-Lyer-shaped insulating slits 14 are extended to penetrate through the metalized film in the width direction, so that the slit 13 is bonded to the slit 14. The slit-bonded unit constitutes one or more penetrating type insulating slits 35 (in FIG. 22, the Y-shaped insulating slit 13 and the Muller-Lyer-shaped insulating slit 14 at each of two positions that are the second positions from the right and the left, respectively, are extended in the width direction of the metalized film, so as to be bonded to each other).

By the formation of the insulating slits as described above, between a first small split electrode section composed of plural split electrodes (corresponding to the "first split electrodes" in the third aspect of the invention) 36A and a second small split electrode section composed of plural split electrodes (corresponding to the "first split electrodes" in the third aspect of the invention) 36B is a first large split electrode section. This section is composed of split electrodes 37A larger in electrode area than the split electrodes 36A and 36B (the larger split electrodes correspond to the "second split electrodes" in the third aspect of the invention). At the metallikon-connection section side relative to the first small split electrode sections, a second large split electrode section is formed which is composed of split electrodes 37B larger in electrode area than the split electrodes 36B (the larger split electrodes correspond to the "second split electrodes" in the third aspect of the invention). Each of the split electrodes 36A and one of the split electrodes 37A are connected to each other through a fuse 18. Each of the split electrodes 36B and one of the split electrodes 37A, as well as each of the split electrodes 36B and one of the split electrodes 37B, are connected to each other in the same manner.

In this embodiment also, along the film width direction from the insulating margin 12 side to the metallikon-connection section, the first small split electrode section, the first large split electrode section, the second small split electrode section and the second large split electrode section are arranged in this order to alternate the small split electrode sections with the large split electrode sections in the film width direction. In other words, in the film width direction, each of the small split electrode sections is arranged to be adjacent to one or two of the large split electrode sections. Thus, this second embodiment also produces the same advantageous effects as the first embodiment.

EXAMPLE 7

Hereinafter, a description is made about another example of the metalized film capacitor of the third aspect of the invention. The respective pitches of insulating slits 13, as well as 14, which divide the split electrodes (first split electrodes) 36A, as well as 36B, from each other in each of the metalized films illustrated in FIG. 22, respectively, in the longitudinal direction, were each set to 12.0 mm. The area of the split electrodes 36A was set to ½ of that of the split electrodes 36B. The width of fuses 18 through which the split electrode sections are connected to each other was set to 0.2 mm. The used dielectric bodies were each a polypropylene film 2.5 µm in thickness. The film resistivity of the vapor-deposited electrode in the vicinity of a non-metallikon section was set to 10 Ω/□, and that of the vapor-deposited electrode at the metallikon-connection section was set to 4 Ω/□. In the same way as in Example 1, the thus-formed two metalized films were put onto each other to oppose their metallikon-connection sections with their insulating margins, and then wound up. The wound body was shaped into an elliptic form, and then a metallikon for electrode-leading-out was formed at each of both ends of the wound body to produce a capacitor element.

Next, a description is made about the characteristic examples of the metalized film capacitors according to the two embodiments of the third aspect of the invention (the examples are referred to as "Example 6" and "Example 7", respectively, hereinafter) while the examples are compared with a comparative example. About the metalized film capacitors according to the two embodiments of the third aspect of the invention, their split electrode sizes (or their insulating slit pitches), the widths of their fuses, and the resistivity values of their vapor-deposited electrode films are as described above.

COMPARATIVE EXAMPLE 4

Next, a metalized film capacitor of a comparative example is described. The pitch of the insulating slits 5 for dividing the split electrodes 7 of the metalized film illustrated in FIG. 2 ([FIG. 2-A]) from each other in the film longitudinal direction was set to 10.0 mm; the pitch of the insulating slits 6 for dividing the split electrodes from each other in the film width direction, 18 mm; and the width of the fuses 8 and 11 for connecting the split electrodes 7 to each other, 0.2 mm. The used dielectric body was a polypropylene film 2.5 µm in thickness. The film resistivity of the vapor-deposited electrode in the vicinity of a non-metallikon section was set to 10 Ω/□, and that of the metallikon-connection section was set to 4 Ω/□.

Two metalized films as described above were put onto each other to oppose their metallikon-connection sections with their insulating margins, and then wound up. The wound body was shaped into an elliptic form, and then a metallikon for electrode-leading-out was formed at each of both ends of the wound body to produce a capacitor element. Furthermore, as illustrated in FIG. 7, five capacitor elements 25 were connected to each other through an electrode plate 26, and then leading-out terminals 27 were connected thereto. The connected capacitor elements 25 were then packed into a case 28. The case was filled with an epoxy resin 29, and the resin was cured. In this way, a metalized film capacitor having a capacity of 800 µF was produced.

About each of Examples 6 and 7, and Comparative Example 4, the above-mentioned sample was prepared to conduct a durability test (at a temperature of 110° C. under application of 750 V (DC) for 1000 hours). After the end of the test, the change ratio in the electrostatic capacity of the sample was measured. The test results are shown in Table 3.

According to the test results in Table 3, in Examples 6 and 7, short circuit was not generated at the end of the test while in Comparative Example 4, short circuit was generated during the test. This appears to be based on the following: When dielectric breakdown is generated in the dielectric polypropylene films of the metalized films according to Examples 6 and 7, an electric current sufficient for separating and scattering the concerned fuse flows from the concerned second split electrodes (split electrodes relatively large in electrode area) into the concerned first split electrodes (split electrodes relatively small in electrode area). As a result, the split electrodes where the dielectric breakdown is caused can be separated so that the generation of short circuit can be avoided. By contrast, when dielectric breakdown is generated in the metalized films according to Comparative Example 4, an electric current sufficient for scattering and separating the fuses connected to the split electrodes does not flow into the fuses, so that the metalized films turn into a short circuit mode. As described herein, according to the metalized film capacitor of the third aspect of the invention, the split electrodes where dielectric breakdown is caused are easily separated so that the capacitor gains stable safety-keeping performance.

TABLE 3

|  | Electrostatic capacity change ratio (%) | Safety-keeping performance |
| --- | --- | --- |
| Example 6 | −3.9% | Good |
| Example 7 | −7.5% | Good |
| Comparative Example 4 | −16.4% (short circuit) | Poor |

The invention is not limited to the above-mentioned embodiments, and may be variously changed into others than the embodiments as far as the resultant variations do not depart from the subject matter thereof. In Example 6 (in FIG. 19) described above, for example, the length in the film width direction of the small split electrode sections (first and second small split electrode sections) is made equal to that of the large split electrode sections (first and second large split electrode sections), the arrangement pitch of the insulating slits 53 is made equal to that of the insulating slits 55, and the length in the film longitudinal direction of the split electrodes (first split electrodes) constituting each of the first and second small split electrode sections is made equal to that of the split electrodes (second split electrodes) constituting each of the first and second large split electrode sections. However, the invention is not limited to this manner. A metalized film may be formed to have a structure as illustrated in FIG. 23.

Figure 23:
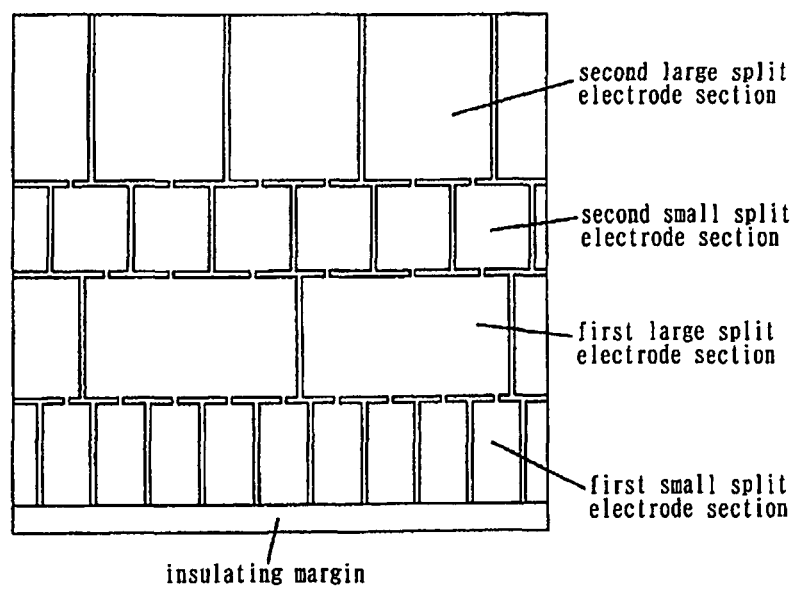
[FIG. 23] A drawing illustrating a varied form of the metalized film constituting the metalized film capacitor of the third aspect of the invention.

FIG. 23 is a drawing illustrating a varied form of the metalized film which constitutes the metalized film capacitor of the third aspect of the invention. As illustrated in FIG. 23, the metalized film may be formed to have a structure in which the length in the film width direction of small split electrode sections (first and second small split electrode sections) is different from that of large split electrode sections (first and second large split electrode sections). Moreover, as illustrated in FIG. 23, the metalized film may have a structure in which the respective lengths in the film longitudinal direction of split electrodes (first split electrodes) constituting the first and second small split electrode sections, respectively, may be different from each other, as well as the respective lengths in the film longitudinal direction of split electrodes (second split electrodes) constituting the first and second large split electrode sections, respectively.

In the above-mentioned embodiments, the respective electrode areas of the first split electrodes arranged in the film longitudinal direction are made equal to each other. However, the areas may be made different from each other. In the same way, the respective electrode areas of the second split electrodes arranged in the film longitudinal direction are made equal to each other. However, the areas may be made different from each other. In essence, the electrode area of the second split electrodes, which are adjacent to the first split electrodes constituting the small split electrode sections and constitute the large split electrode sections, needs only to be larger than that of the first split electrodes.

When two metalized films are put onto each other, these metalized films may be metalized films having the same electrode pattern or may be metalized films having electrode patterns different from each other. In this case also, it is preferred to put the metalized films onto each other to oppose the whole of one or more large split electrode sections in one of the paired metalized films to one or more small split electrode sections formed in the other metalized film. This manner makes it possible that even when dielectric breakdown is generated in some second split electrodes formed in one of the metalized films, electric insulation of these second split electrodes is restored. Thus, the element can keep a function of a capacitor.

In the above-mentioned embodiments, split electrode sections (small split electrode sections and large split electrode sections), in each of which an vapor-deposited electrode is divided into split electrodes by insulating slits arranged in the longitudinal direction of each metalized film and at intervals, are arranged in four rows in the width direction. However, the number of rows of arranged split electrode sections is not limited thereto, and may be three, or five or more.

Figure 24:
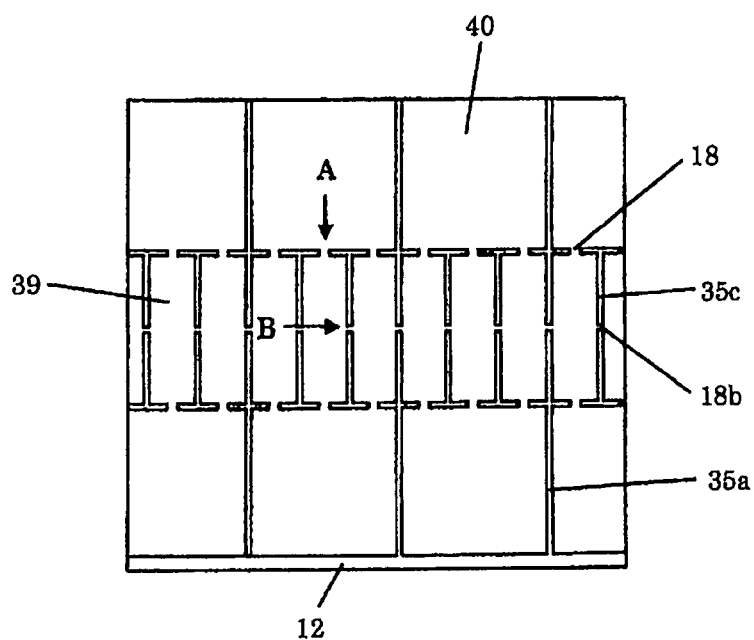
[FIG. 24] A drawing illustrating another varied form of the metalized film constituting the metalized film capacitor of the third aspect of the invention.

FIG. 24 is another varied form of the metalized film which constitutes the metalized film capacitor of the third aspect of the invention. In FIG. 24, split electrode sections are arranged in three rows in the width direction. Specifically, a small split electrode section composed of split electrodes (first split electrodes) 39 is arranged at a central region in the width direction of a film, and large split electrode sections composed of split electrodes (second split electrodes) 40 larger in electrode area than the split electrodes 39 are arranged at both outsides in the width direction of the small split electrode section, respectively, so as to be adjacent to the small split electrode section. Any adjacent two of the first split electrodes 39, between which an insulating slit 35c arranged in the small split electrode section is sandwiched in the longitudinal direction, are connected to each other through a fuse 18b.

The width A of a fuse for connecting any one of the first split electrodes 39 forming the small split electrode section to one of the second split electrodes 40 forming the large split electrode sections may be made larger than the width B of the fuse 18b for connecting any adjacent two of the first split electrodes 39. Such a structure makes it possible to cause an electric current to flow through the individual fuses 18b to increase the number of electric current paths further in the central region of the capacitor element. Thus, self-heating of the region can be restrained. By making the width of the fuses 18 than that of the fuses 18b, sufficient fuse-acting performance can be certainly kept even in the split electrodes at the film center, which are each small in area to be small in energy for causing the concerned fuses to act.

Figure 25:
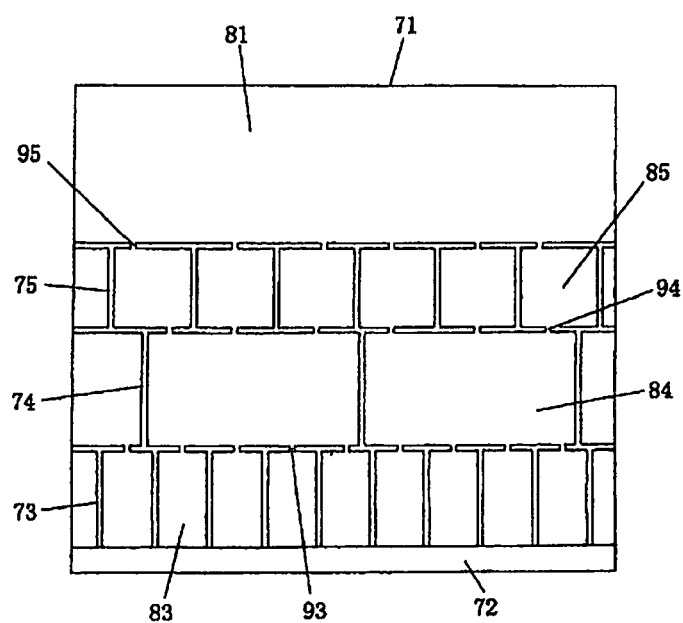
[FIG. 25] A drawing illustrating an embodiment of the metalized film constituting the metalized film capacitor of the fourth aspect of the invention.

FIG. 25 is a drawing illustrating an embodiment of a metalized film which constitutes the metalized film capacitor of the fourth aspect of the invention. In the metalized film, one (electrode-forming region) of both end regions in the width direction of the metalized film (hereinafter simply referred to as the "width direction") constitutes a metallikon-connection section 71 where an electrode-leading-out metallikon is to be connected. In the other end region, an insulating margin (region where no vapor-deposited electrode is formed in one end region in the width direction of the metalized film) 72 is formed. An vapor-deposited electrode is formed in the film front-surface area except the insulating margin 72, so as to cover regions other than insulating slits.

At the insulating margin 72 side of the metalized film, insulating slits 73 in a T-shaped form are arranged in the longitudinal direction of the metalized film (hereinafter simply referred to as the longitudinal direction) and at regular intervals. At the metallikon-connection section side relative to the insulating slits 73 arranged in the longitudinal direction, insulating slits 74 in a T-shaped form are arranged in the longitudinal direction and at regular intervals that are (four times in this embodiment) larger than the intervals between the insulating slits 73. Furthermore, at the metallikon-connection section side relative to the insulating slits 74 arranged in the longitudinal direction, insulating slits 75 in a T-shaped form are arranged in the longitudinal direction and at regular intervals that are smaller than the intervals between the insulating slits 74 (in this embodiment, about ⅓ of the latter intervals). Between the insulating slits 75 arranged in the longitudinal direction and the metallikon-connection section 71 is formed a non-split electrode section 81 in which the vapor-deposited electrode is continuous in the longitudinal direction. The respective slit widths of the insulating slits 73, 74 and 75 are each, for example, 0.2 mm.

Small split electrodes 83 formed by dividing the vapor-deposited electrode by the insulating slits 73 are arranged, and these small split electrodes 83 constitute a first small split electrode section. Large split electrodes 84 formed by dividing the vapor-deposited electrode by the insulating slits 74 are arranged, and these large split electrodes 84 constitute a large split electrode section. Furthermore, small split electrodes 85 formed by dividing the vapor-deposited electrode by the insulating slits 75 are arranged, and these small split electrodes 85 constitute a second small split electrode section. The electrode area of each of the large split electrodes 84 is larger than that of each of the small split electrodes 83 as well as that of each of the small split electrodes 85. In this embodiment, the electrode area of the large split electrodes 84 is at least twice larger than that of the small split electrodes 83 as well as that of the small split electrodes 85. The large split electrode section is formed between the first and second split electrode sections in the width direction to be adjacent thereto.

As described above, in this embodiment, in the film width direction from the insulating margin 72 side to the metallikon-connection section 71, the first small split electrode section, the large split electrode section, the second small split electrode section, and the non-split electrode section 81 are arranged in this order. In other words, each of the small split electrode sections (first and second small split electrode sections) is arranged adjacently to either the large split electrode section or the non-split electrode section. Each of the small split electrodes 83 is connected to one of the large split electrodes 84 through a fuse 93 formed between any two of the insulating slits 73, between the two the small split electrode 83 being sandwiched in the longitudinal direction. Each of the small split electrodes 85 is connected to one of the large split electrodes 84 and the non-split electrode section 81 through a fuse 94 and a fuse 95, respectively, the fuse 94 being formed between the insulating slits 74 between which the small split electrode 85 is sandwiched in the longitudinal direction, and the fuse 95 being formed between the insulating slits 75 between which the small split electrode 85 is sandwiched in the longitudinal direction.

As described above, according to this embodiment, in the film width direction, each of the small split electrode sections, which are composed of the small split electrodes 83 and 85 relatively small in electrode area, respectively, is arranged adjacently to either the large split electrode section, which is composed of the large split electrodes 84 relatively large in electrode area, or the non-split electrode section 81. Each of the small split electrodes 83 is connected to one of the large split electrodes 84 through one of the fuses 93, and each of the small split electrodes 85 is connected to the large split electrode 84 and the non-split electrode section 81 through one of the fuses 94 and one of the fuses 95, respectively. For this reason, one end region of each of the small split electrodes 83, as well as each of the end regions of each of the small split electrodes 85, is connected to either one of the large split electrodes 84 larger in electrode area than the small split electrodes 83 as well as 85, or the non-split electrode section 81 through one of the fuses. Thus, even when dielectric breakdown is generated in some of the small split electrodes 83 or 85, an electric current sufficient to cause the concerned fuses to act flows into the small split electrodes 83 or 85 from the large split electrode 84 or the non-split electrode section 81 adjacent to these electrodes 83 or 85. As a result, these fuses are permitted to act certainly (to cause the vapor-deposited electrode in the fuse regions to scatter), so that the split electrodes where the dielectric breakdown is caused can be separated.

According to this embodiment, the large split electrode section is arranged between the first and second split electrode sections to be adjacent thereto; thus, even when the dielectric body is deteriorated by heat, voltage or some other in the first or second small split electrode section so that over, e.g., some of the small split electrodes 85 their fuses act, extreme disturbance of electric current paths can be prevented.

Figure 26A:
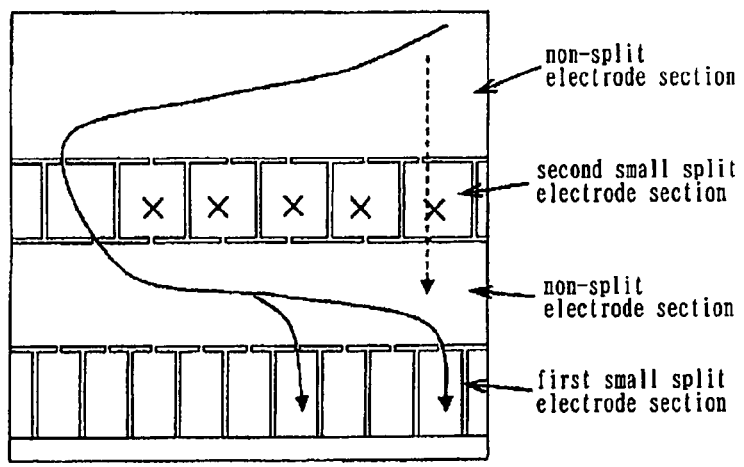
FIG. 26(a) and FIG. 26(b) are each a schematic view illustrating one or more electric current paths flowing in an vapor-deposited electrode.
Figure 26B:
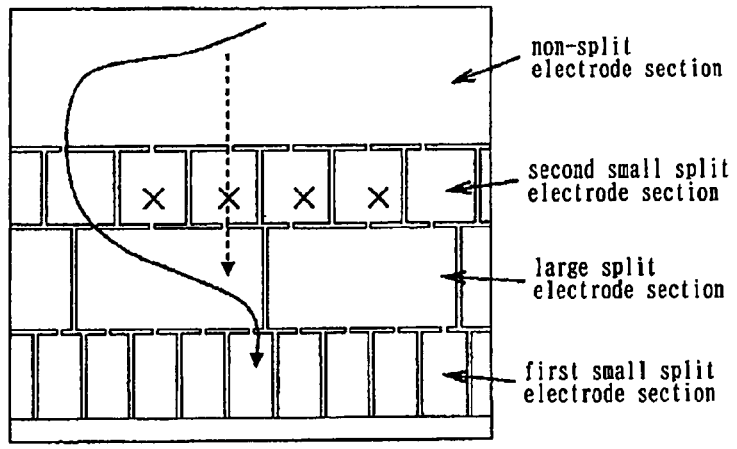

FIG. 26(a) and FIG. 26(b) are each a schematic view of one or more paths of an electric current flowing in an vapor-deposited electrode. FIG. 26(a) shows a case where a non-split electrode section is arranged between a first small split electrode section and a second small split electrode section in the film width direction to be adjacent thereto; and FIG. 26(b) a case where a large split electrode section is arranged between a first small split electrode section and a second small split electrode section in the film width direction to be adjacent thereto. In the case shown in FIG. 26(a), no insulating slit for dividing the vapor-deposited electrode is present in the non-split electrode section; therefore, in a case where over plural small split electrodes their fuses act, the electric current path(s) therein may be extremely disturbed. As a result, the capacitor may undergo an extreme rise in dielectric loss and equivalent series resistance. By contrast, as illustrated in FIG. 26(b), a large split electrode section is arranged between first and second split electrode sections in the width direction of a metalized film to be adjacent thereto, thereby making it possible that insulating slits formed in the large split electrode section regulate an electric current path to prevent the electric current path from being extremely disturbed.

Figure 27:
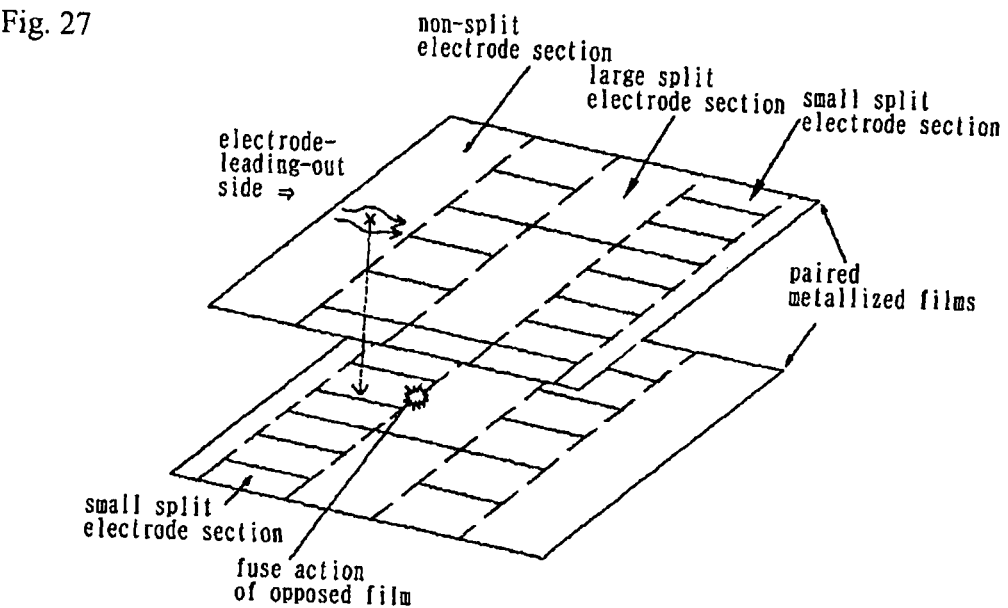
[FIG. 27] A drawing showing electric current paths when dielectric breakdown is caused at a non-split electrode position of one of paired metalized films constituting a metalized film capacitor of the fourth aspect of the invention.

When the metalized film capacitor is made from paired metalized films that are two metalized films put onto each other, it is preferred that the electrode surfaces of the whole of one or more large split electrode sections and one or more non-split electrode sections formed in one of the paired metalized films are opposed to one or more small split electrode sections formed in the other metalized film. As illustrated in, for example, FIG. 27, according to this structure, even when one of the paired metalized films the metalized film positioned at the upper side in the drawing) undergoes dielectric breakdown, which is caused beyond the self-restoring function (self-healing function) of the metalized film, in its non-split electrode section (the dielectric body is broken at sites marked by "x") (even when the vapor-deposited electrodes in the paired metalized films are made conductive to each other through its broken dielectric site), an electric current flows from the large split electrode which is adjacent to the small split electrode formed in the other of the opposed paired metalized films and which is larger in electrode area than the small split electrode, or from the non-split electrode section to the split electrode. For this reason, the fuse formed at one end region of the small split electrode formed in the other metalized film, out of the paired metalized films, acts certainly (to cause the vapor-deposited electrode at the fuse region to scatter), so that the non-split electrode section, where the dielectric breakdown is generated, can be separated from the other split electrodes. As a result of this effect, even when dielectric breakdown is caused in the non-split electrode section formed in one of the paired metalized films, electric insulation of the non-split electrode section is restored so that the metalized films can maintain the function of a capacitor.

Figure 28:
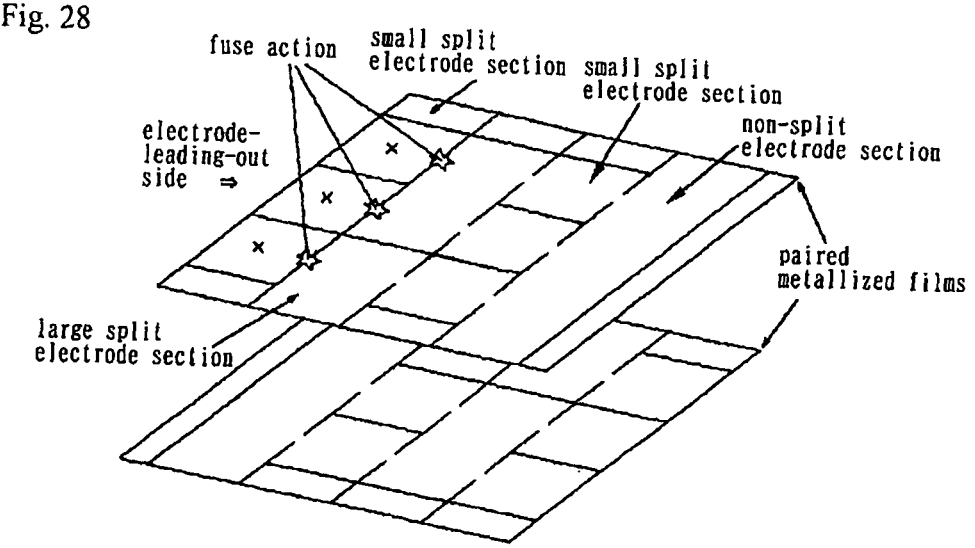
[FIG. 28] A drawing showing electric current paths when dielectric breakdown is caused at non-split electrode positions of one of paired metalized films constituting a metalized film capacitor of a comparative example.

Furthermore, when two metalized films are put onto each other as described above, it is preferred that any one of the non-split electrode sections is arranged at the metallikon-connection section side of each of the metalized films for the following reason: if a split electrode section is arranged at the metallikon-connection section side (electrode-leading-out side), the following may be caused when dielectric breakdown is generated in this split electrode section (the dielectric body is broken at sites marked by "x" in its split electrodes): fuses for connecting this split electrode section to the non-split electrode section act, so that an electric current path from the split electrode section is completely blocked. Thus, the element may come not to function as a capacitor (in FIG. 28). Against this, the non-split electrode section is arranged at the metallikon-connection section side, whereby the following is attained: even when dielectric breakdown is generated in the non-split electrode section (the non-split electrode section formed in one of the paired metalized films), the fuse acts, the fuse being a fuse for connecting one of the small split electrodes formed in the other metalized film (the other metalized film out of the opposed paired metalized films; in FIG. 27, the metalized film arranged at the lower side) to the non-split electrode section or large split electrode adjacent to this small split electrode. This matter makes it possible that the present element keeps holding an electrode region functioning as a capacitor.

EXAMPLE 8

Figure 29:
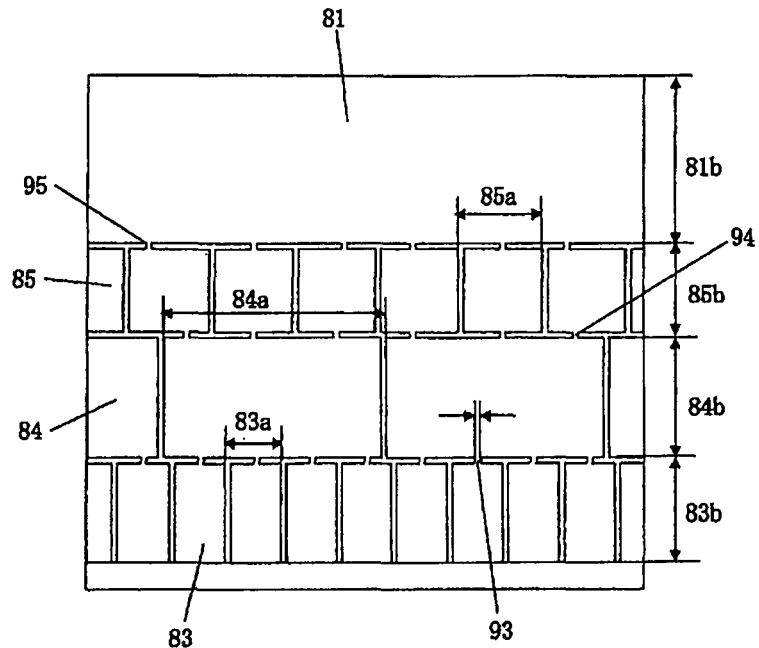
[FIG. 29] A drawing illustrating a metalized film constituting a metalized film capacitor of the fourth aspect of the invention.

Hereinafter, with reference to FIG. 29, a description is made about an example of the metalized film capacitor of the fourth aspect of the invention. In FIG. 29, the size 83a in the longitudinal direction of small split electrodes 83 constituting a first small split electrode section was set to 4.0 mm; the size 85a in the longitudinal direction of small split electrodes 85 constituting a second small split electrode section, 5.0 mm; and the size 84a in the longitudinal direction of large split electrodes constituting a large split electrode section, 16.0 mm. The size 83b in the film width direction of the first small split electrode section (from the boundary between the section and an insulating margin 72 to the boundary between insulating slits 73 and the large split electrodes 84) was set to 12.5 mm; the size 84b in the film width direction of the large split electrodes 84 (the electrode size including no insulating slit size), 9.0 mm; the size 85b in the film width direction of the second small split electrode section (from the boundary between the large split electrodes 84 and insulating slits 74 to that between insulating slits 75 and a non-split electrode section 81), 12.5 mm; and the size 81b in the film width direction of the non-split electrode section 81, 14.0 mm. The respective sizes of fuses 93, 94 and 95 were each set to 0.2 mm. The used dielectric body was a polypropylene film 2.5 μm in thickness. The film resistivity of the vapor-deposited electrode in the vicinity of the non-metallikon section was set to 10 Ω/□, and that of the metallikon-connection section was set to 4 Ω/□.

Two metalized films as described above were put onto each other to oppose their metallikon-connection sections with their insulating margins, and then wound up. The wound body was shaped into an elliptic form, and then a metallikon for electrode-leading-out was formed at each of both ends of the wound body to produce a capacitor element. Furthermore, as illustrated in FIG. 7, five capacitor elements 25 were connected to each other through an electrode plate 26, and then leading-out terminals 27 were connected thereto. The connected capacitor elements 25 were then packed into a case 28. The case was filled with an epoxy resin 29, and the resin was cured. In this way, a metalized film capacitor having a capacity of 800 μF was produced.

COMPARATIVE EXAMPLE 5

Next, Example 8 of the metalized film capacitor according to the fourth aspect of the invention is described while compared with a comparative example. About the metalized film capacitor according to the fourth aspect of the invention, its split electrode sizes, its fuse widths, and its vapor-deposited electrode film resistivities are as described above.

Figure 30:
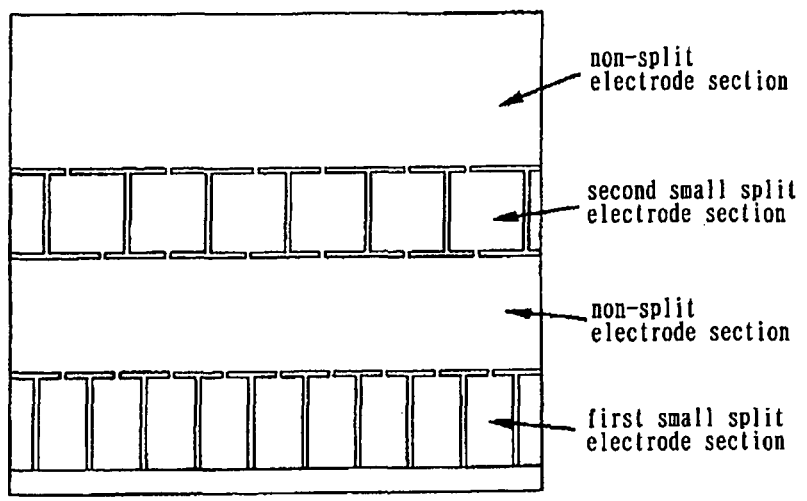
[FIG. 30] A drawing illustrating a metalized film according to Example 9.

Next, Example 9 of the metalized film capacitor is described. In FIG. 30 is shown a metalized film according to Example 9. Example 9 is different from Example 8 in that between first and second small split electrode sections thereof is arranged a non-split electrode section instead of the large split electrode section. Other structural factors and the sizes thereof are equal to those in Example 8.

The metalized film capacitor illustrated in FIG. 2-A was used as Comparative Example 5. The pitch of the insulating slits 5 for dividing the split electrodes 7 of the metalized film illustrated in FIG. 2-A from each other in the film longitudinal direction was set to 10.0 mm, and that of the insulating slits 6 for dividing the split electrodes 7 from each other in the film width direction was set to 18 mm. The width of the fuses 8 and 11, for connecting the split electrodes 7 to each other, was set to 0.2 mm. The used dielectric body was a polypropylene film 2.5 μm in thickness. The film resistivity of the vapor-deposited electrode in the vicinity of the non-metallikon section was set to 10 Ω/□, and that of the vapor-deposited electrode at the metallikon-connection section was set to 4 Ω/□.

The metalized film described in Example 9 and a film equivalent thereto, as well as the film in Comparative Example 5 and a film equivalent thereto, were put onto each other to oppose their metallikon-connection sections to their insulating margins, and then wound up. The wound bodies were each shaped into an elliptic form, and then a metallikon for electrode-leading-out was formed at each of both ends of the wound body to produce each capacitor element. Furthermore, as illustrated in FIG. 7, five capacitor elements 25 were connected to each other through an electrode plate 26, and then leading-out terminals 27 were connected thereto. The connected capacitor elements 25 were then packed into a case 28. The case was filled with an epoxy resin 29, and the resin was cured. In this way, each metalized film capacitor having a capacity of 800 μF was produced.

About each of Examples 8 and 9, and Comparative Example 5, the above-mentioned sample was prepared to conduct a durability test (at a temperature of 110° C. under application of 750 V (DC) for 1000 hours). After the end of the test, the change ratio in the electrostatic capacity of the sample was measured. The test results are shown in Table 4.

TABLE 4

|  | Electrostatic capacity change ratio (%) | Safety-keeping performance |
|---|---|---|
| Example 8 | −4.1 | Good |
| Example 9 | −3.4 | Good |
| Comparative Example 5 | −24.8 (short circuit) | Poor |

According to the test results in Table 4, in Examples 8 and 9 short circuit was not generated while in Comparative Example 5 short circuit was generated during the test. This appears to be based on the following: When dielectric breakdown is generated in the dielectric polypropylene films of the metalized films according to Examples 8 and 9, an electric current sufficient for separating and scattering the concerned fuse flows from the concerned large split electrodes or the non-split electrode section into the concerned small split electrodes. As a result, the split electrodes where the dielectric breakdown is caused can be separated so that the generation of short circuit can be avoided. By contrast, when dielectric breakdown is generated in the metalized films according to Comparative Example 5, an electric current sufficient for scattering and separating the fuses connected to the split electrodes does not flow into the fuses, so that the metalized films turn into a short circuit mode.

Subsequently, about Examples 8 and 9, wherein good safety-keeping performance was obtained, the electrostatic capacity thereof was changed by about −70 to −80% of the initial value thereof. The dielectric tangent at this time was measured, and the ratio of a change thereof from the initial value was evaluated. The results are shown in Table 5. In order to change the electrostatic capacity, a voltage of 1500 V (DC) was applied to each of the samples at an atmospheric temperature of 120° C. for 5 minutes.

TABLE 5

|  | Electrostatic capacity change ratio (%) | Dielectric tangent change ratio (%) |
| --- | --- | --- |
| Example 8 | −80.1 | −45 |
| Example 9 | −82.0 | +63 |
| Comparative Example 5 | — | Poor |

As is evident from the test results in Table 5, in Example 8 the change ratio of the dielectric tangent was a negative value while in Example 9 the ratio was a positive value and was further a largely elevated value. This is caused by a matter that in Example 9, over some of the small split electrodes their fuses act by the dielectric breakdown of the dielectric body so that one or more electric current paths are disturbed. By contrast, Example 8 produces an advantageous effect as described in the following, which is different from Example 9: at the end of the lifespan of any capacitor or under severe use conditions, the dielectric tangent thereof may rise largely from the initial value thereof (the resistance component of the capacitor increases); in this case, the capacitor may undergo intense self-heating to deteriorate in voltage endurance performance and safety-keeping performance; accordingly, in Example 8, in which the change ratio of the dielectric tangent does not rise remarkably, the possibility that the voltage endurance performance and the safety-keeping performance are deteriorated can be decreased.

The fourth aspect of the invention is not limited to the above-mentioned embodiment, and may be variously changed into others than the embodiment as far as the resultant variations do not depart from the subject matter thereof. For example, the embodiment has a structure of four rows, wherein the non-split electrode section, the first small split electrode section, the large split electrode section, and the second small split electrode section are arranged in the film width direction. However, the aspect is not limited thereto, and may have a structure of three rows wherein a non-split electrode section, a small split electrode section and a large split electrode section are arranged in the film width direction. Moreover, split electrode sections in five or more rows may be arranged as far as some of the sections are at least a non-split electrode section, a small split electrode section and a large split electrode section and further the small split electrode section is arranged adjacently to either the large split electrode section or the non-split electrode section in the film width direction.

Figure 31:
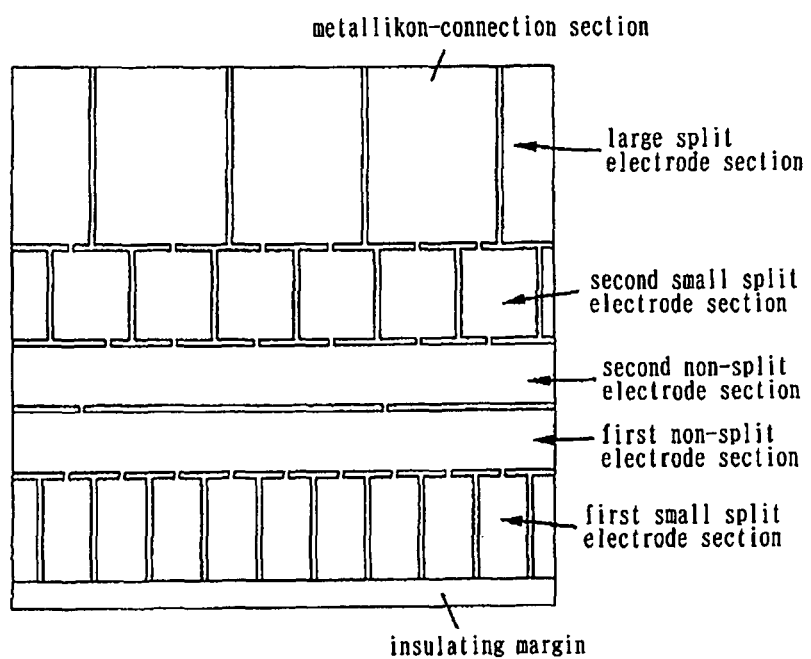
[FIG. 31] A drawing illustrating a varied form of the metalized film constituting the metalized film capacitor of the fourth aspect of the invention.
Figure 32:
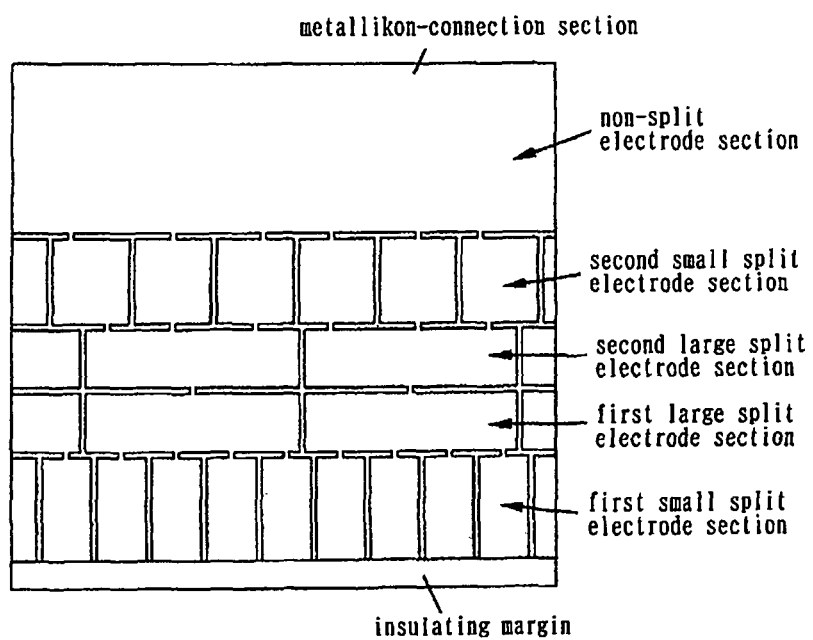
[FIG. 32] A drawing illustrating a varied form of the metalized film constituting the metalized film capacitor of the fourth aspect of the invention.
Figure 33:
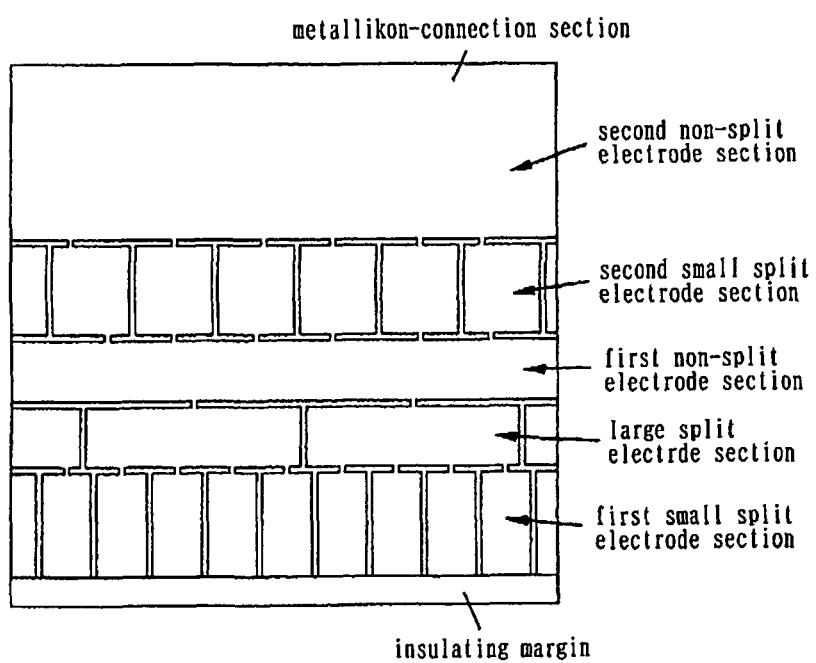
[FIG. 33] A drawing illustrating a varied form of the metalized film constituting the metalized film capacitor of the fourth aspect of the invention.

FIGS. 31 to 33 are each a drawing illustrating a varied form of a metalized film constituting the metalized film capacitor of the fourth aspect of the invention. In the metalized film illustrated in FIG. 31, in the film width direction from the insulating margin side to its metallikon-connection section, a first small split electrode section, a first non-split electrode section, a second non-split electrode section, a second small split electrode section, and a large split electrode section are arranged in this order. In the metalized film illustrated in FIG. 32, in the film width direction from the insulating margin side to its metallikon-connection section, a first small split electrode section, a first large split electrode section, a second large split electrode section, a second small split electrode section, and a non-split electrode section are arranged in this order. In the metalized film illustrated in FIG. 33, in the film width direction from the insulating margin side to its metallikon-connection section, a first small split electrode section, a large split electrode section, a first non-split electrode section, a second small split electrode section, and a second non-split electrode section are arranged in this order. According to each of the structures, even when dielectric breakdown is generated in some of its small split electrodes, an electric current sufficient for causing fuses to act flows from large split electrodes or the non-split electrode section adjacent to the small split electrodes, so as to permit the fuses to act certainly (to cause the vapor-deposited electrode at the fuse regions to scatter). Thus, the split electrodes wherein the dielectric breakdown is caused can be separated.

In the above-mentioned embodiment, the respective electrode areas of the small split electrodes arranged in the film longitudinal direction are made equal to each other; however, the areas may be made different. In the same manner, the respective electrode areas of the large split electrodes arranged in the film longitudinal direction are made equal to each other; however, the areas may be made different. In essence, the electrode area of each of the large split electrodes that is adjacent to one of the small split electrodes needs only to be larger than that of the small split electrode. In this case also, it is preferred that the electrode area of each of the large split electrodes is at least twice larger than that of the small split electrode adjacent thereto.

When two metalized films are put onto each other, these metalized films may be metalized films having the same electrode pattern or may be metalized films having electrode patterns different from each other. In this case also, it is preferred to put the metalized films onto each other to oppose the whole of one or more large split electrode sections and one or more non-split electrode sections in one of the paired metalized films to one or more small split electrode sections formed in the other metalized film. This manner makes it possible that even when dielectric breakdown is generated in one or some of the large split electrode and the non-split electrode section formed in one of the metalized films, electric insulation of the large split electrodes or the non-split electrode section is restored. Thus, the element can keep a function of a capacitor.

Although the invention has been described with reference to specific embodiments, this description is not meant to be construed in a limiting sense. Various modifications of the disclosed embodiment, as well as other embodiments of the present invention, will become apparent to persons skilled in the art upon reference to the description of the invention. It is therefore contemplated that the appended claims will cover any such modifications or embodiments as fall within the true scope of the invention.

DESCRIPTION OF THE REFERENCE NUMERALS

| | |
| --- | --- |
| 1 | polypropylene film |
| 2 | metallikon-vicinity vapor-deposited electrode |
| 3 | non-metallikon-vicinity vapor-deposited electrode |
| 4 | insulating margin |
| 5 | width direction insulating slit |
| 6 | longitudinal direction insulating slit |
| 7, 7a and 7b | split electrode |
| 8, 8a and 8b | fuse |
| 9 | longitudinal direction insulating slit in the vicinity of metallikon |
| 10, 10a and 10b | metallikon-connection section |
| 11 | fuse in the vicinity of metallikon |
| 12, 12a and 12b | insulating margin |
| 13 and 13a | Y-shaped insulating slit |
| 14 and 14a | Muller-Lyer-shaped insulating slit |

-continued

DESCRIPTION OF THE REFERENCE NUMERALS

| | |
|---|---|
| 15 | split electrode |
| 16 | split electrode |
| 17 | non-split electrode |
| 18, 18a and 18b | fuse |
| 19 | split electrode |
| 20 | Y-shaped/Muller-Lyer-shaped joint insulating slit |
| 21 | split electrode |
| 22 | split electrode |
| 23 | non-split electrode |
| 24 | fuse |
| 25 | capacitor element |
| 26 | electrode plate |
| 27 | leading-out terminal |
| 28 | case |
| 29 | epoxy resin |
| 30 | dielectric breakdown site |
| 31 | electric current flowing into split electrode |
| 32 | dielectric breakdown site |
| 33 | electric current flowing into split electrode |
| 34 | electric current flowing into split electrode |
| 35, 35a, 35b and 35c | insulating slit |
| 39 | first split electrode (split electrode that form central split electrode section) |
| 39a | film longitudinal direction size of first split electrode |
| 40 | second split electrode (split electrode that forms outside split electrode section) |
| 40a | film longitudinal direction size of second split electrode |
| 41 | split electrode (split electrode that forms central split electrode section) |
| 42 | split electrode (split electrode that forms outside split electrode section) |
| 43 | split electrode (split electrode that forms outside split electrode section) |
| 44 | split electrode (split electrode that forms outside split electrode section) |
| 45 | split electrode (split electrode that forms central split electrode section) |
| 36A and 36B | first split electrode |
| 37A and 37B | second split electrode |
| 52 | insulating margin |
| 53, 54 and 55 | insulating slit |
| 53a, 54a and 55a | length of slit extended in film longitudinal direction |
| 56, 57 and 58 | fuse |
| 61 and 62 | first split electrode |
| 63 and 64 | second split electrode |
| 61a | film longitudinal direction size of split electrode (constituting first small, split electrode section) |
| 62a | film longitudinal direction size of split electrode (constituting second small split electrode section) |
| 63a | film longitudinal direction size of split electrode (constituting first large split electrode section) |
| 64a | film longitudinal direction size of split electrode (constituting second large split electrode section) |
| 71 | metallikon-connection section |
| 72 | insulating margin |
| 73, 74 and 75 | insulating slit |
| 81 | non-split electrode |
| 83 and 85 | small split electrode |
| 84 | large split electrode |
| 93, 94 and 95 | fuse |
| 83a | film longitudinal direction size of small split electrode 83 |
| 84a | film longitudinal direction size of large split electrode 84 |
| 85a | film longitudinal direction size of small split electrode 85 |
| 81b | film width direction size of non-split electrode section 81 |
| 83b | film width direction size of small split electrode 83 |
| 84b | film width direction size of large split electrode 84 |
| 85b | film width direction size of small split electrode 85 |

The invention claimed is:

1. A metalized film capacitor, comprising a capacitor element formed by winding up or stacking one or more metalized films in which an vapor-deposited electrode is laid on at least one surface of a dielectric film, and an electrode-leading-out metallikon connected to each of both end faces of the capacitor element, wherein the metalized film comprises at least three electrode sections, including
one or more split electrode sections in which the vapor-deposited electrode is divided by plural insulating slits arranged in the longitudinal direction of the metalized film to form a split electrode, and
one or more non-split electrode sections in which the vapor-deposited electrode is continuous in the longitudinal direction are arranged in the width direction of the metalized film,
wherein the one or more split electrode sections and the one or more non-split electrode sections forming at least three electrode sections are arranged so as to alternate each split electrode section with each non-split electrode section in a width-wise direction; and
wherein for each one of the at least one split electrode sections, each of the split electrodes, which correspond to segments of said one split electrode section, is connected to the non-split electrode section through a fuse formed between an end region of one of any adjacent two of the insulating slits and an end region of the other.

2. The metalized film capacitor according to claim 1, wherein the capacitor element is made of a metalized film pair in which two of the metalized films are stacked onto each other, and
the whole of the non-split electrode section formed in one of the paired metalized films is opposed to the split electrode formed on the other metalized film.

3. The metalized film capacitor according to claim 2, wherein the non-split electrode section is arranged at a metallikon-connection section side of the metalized film.

4. The metalized film capacitor according to claim 1, wherein the metalized film has, in an end region thereof at an opposite side in the width direction of the section where the metallikon is to be connected, an insulating margin where no vapor-deposited electrode is formed;
the capacitor comprising
a first split electrode section in which plural Y-shaped insulating slits are arranged in the longitudinal direction at the insulating margin side of the film, whereby split electrodes are formed between the Y-shaped insulating slits, and
a second split electrode section in which Muller-Lyer-shaped insulating slits are arranged in parallel to the arrangement direction of the Y-shaped insulating slits, whereby split electrodes are formed between the Muller-Lyer-shaped insulating slits; and
the non-split electrode section being formed between the first split electrode section and the second split electrode section.

5. The metalized film capacitor according to claim 4, wherein a plurality of the second split electrode sections are formed in the width direction, and
the non-split electrode section is formed between any adjacent two of the second split electrodes.

6. The metalized film capacitor according to claim 4, wherein plural Y-shaped insulating slits are arranged along the longitudinal direction at the metallikon-connection section side, whereby the capacitor further comprises a third split electrode section in which split electrodes are formed between the Y-shaped insulating slits, and any one of the non-split electrode sections is formed between any one of the second split electrode sections and the third split electrode section.

7. The metalized film capacitor according to claim 1, comprising an insulating margin side split electrode section in which plural Y-shaped insulating slits are arranged along the longitudinal direction at the insulating margin side, whereby split electrodes are formed between the Y-shaped insulating slits, and a metallikon-connection section side split electrode section in which plural Y-shaped insulating slits are arranged along the longitudinal direction at a metallikon-connection section side, whereby split electrodes are formed between the Y-shaped insulating slits; and the non-split electrode section being formed between the insulating margin side split electrode section and the metallikon-connection section side split electrode section.

8. A metalized film capacitor, comprising a capacitor element formed by winding up or stacking one or more metalized films in which an vapor-deposited electrode is laid on at least one surface of a dielectric film, and an electrode-leading-out metallikon connected to each of both end faces of the capacitor element, wherein the metalized film comprises split electrode sections in which the vapor-deposited electrode is divided into plural split electrodes by insulating slits arranged in the longitudinal direction of the metalized film and at intervals are arranged in three or more rows in the width direction of the film;

each of the split electrodes, which constitute the individual split electrode sections, is connected to any one of the split electrodes that is adjacent to the split electrode in the width direction through a fuse formed between any two of the insulating slits, between the two the split electrode being sandwiched in the longitudinal direction; and the area of each of the split electrodes that form one or more central split electrode sections arranged in a central region in the width direction, out of all the split electrode sections, is smaller than that of each of the split electrodes that form outside split electrode sections arranged at the outsides in the width direction of the central split electrode section, respectively.

9. The metalized film capacitor according to claim 8, wherein the interval between the insulating slits arranged in the central split electrode section is smaller than that between the insulating slits arranged in the outside split electrode sections.

10. The metalized film capacitor according to claim 8, wherein the capacitor element is made of a metalized film pair in which two of the metalized films are stacked onto each other, and the central split electrode section formed on one of the paired metalized films overlaps with the central split electrode section formed on the other metalized film.

11. The metalized film capacitor according to claim 8, wherein any adjacent two of the split electrodes arranged in the central split electrode section, between the two one of the insulating slits arranged therein being sandwiched in the longitudinal direction, are connected to each other through a fuse; and the width of the fuses through each of which one of the split electrodes that form the central split electrode section is connected to one of the split electrodes that form the outside split electrode sections is larger than that of the fuses through each of which the adjacent two, which are any two of the split electrodes that form the central split electrode section, are connected to each other.

12. A metalized film capacitor, comprising a capacitor element formed by winding up or stacking one or more metalized films in which an vapor-deposited electrode is laid on at least one surface of a dielectric film, and an electrode-leading-out metallikon connected to each of both end faces of the capacitor element, wherein the metalized film comprises one or more small split electrode sections in which plural first split electrodes formed by dividing the vapor-deposited electrode by insulating slits arranged in the longitudinal direction of the metalized film and at intervals are formed along the longitudinal direction, and one or more large split electrode sections in which second split electrodes formed by dividing the vapor-deposited electrode by insulating slits arranged in the longitudinal direction of the metalized film and at intervals are formed along the longitudinal direction, the electrode area of the second split electrodes being larger than that of the first split electrodes;

the small split electrode section being arranged adjacently to the large split electrode section in the width direction of the metalized film; and each of the first split electrodes being connected to any one of the second split electrodes through a fuse formed between two of the insulating slits, between the two the first split electrode being sandwiched in the longitudinal direction; and wherein the capacitor element is made of a metallized film pair in which two of the metallized films are stacked onto each other, and a whole of the large split electrode section, which is formed in one metallized film of the pair, is opposed to the small split electrode section, which is formed in another metallized film of the pair.

13. The metalized film capacitor according to claim 12, wherein the interval between the insulating slits arranged in the small split electrode section is smaller than that of the insulating slits arranged in the large split electrode section.

14. The metalized film capacitor according to claim 12, wherein the large split electrode section is arranged at a metallikon-connection section side of the metalized film.

15. A metalized film capacitor, comprising a capacitor element formed by winding up or stacking one or more metalized films in which a vapor-deposited electrode is laid on at least one surface of a dielectric film, and an electrode-leading-out metallikon connected to each of both end faces of the capacitor element, wherein the metalized film comprises a small split electrode section in which plural small split electrodes formed by dividing the vapor-deposited electrode by insulating slits arranged in the longitudinal direction of the metalized film and at intervals are formed along the longitudinal direction, a large split electrode section in which plural large split electrodes formed by dividing the vapor-deposited electrode by insulating slits arranged in the longitudinal direction of the metalized film and at intervals are formed along the longitudinal direction, the electrode area of the large split electrodes being larger than that of the small split electrodes, and a non-split electrode section in which the vapor-deposited electrode is continuous in the longitudinal direction;

the small split electrode section being arranged adjacently to either the large split electrode section or the non-split electrode section in the width direction of the metalized film; and each of the small split electrodes being connected to any one of the large split electrodes or the non-split electrodes through a fuse formed between two of the insulating slits, between the two the small split electrode being sandwiched in the longitudinal direction; and wherein the capacitor element is made of a metallized film pair in which two of the metallized films are stacked onto each other, and a whole of electrode surfaces of the large split electrode section and the non-split electrode section formed in one metallized film of the metalized film pair is opposed to the small split electrode section formed in another metallized film of the metallized film pair.

16. The metalized film capacitor according to claim 15, comprising, as the small split electrode section, two split electrode sections of a first small split electrode section and a second small split electrode section, and the large split electrode section being arranged between the first and second small split electrode sections and adjacently thereto in the width direction of the metalized film.

17. The metalized film capacitor according to claim 15, wherein the non-split electrode section is arranged at a metallikon-connection section side of the metalized film.

* * * * *